US012554218B2

(12) United States Patent
Kojima

(10) Patent No.: US 12,554,218 B2
(45) Date of Patent: Feb. 17, 2026

(54) TEMPERATURE CONTROL DEVICE AND IMAGE FORMING APPARATUS INCLUDING TEMPERATURE CONTROL DEVICE

(71) Applicant: Toshiba Tec Kabushiki Kaisha, Tokyo (JP)

(72) Inventor: Takeshi Kojima, Tagata Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 58 days.

(21) Appl. No.: 18/583,361

(22) Filed: Feb. 21, 2024

(65) Prior Publication Data

US 2024/0402634 A1 Dec. 5, 2024

(30) Foreign Application Priority Data

Jun. 1, 2023 (JP) ................................ 2023-090901

(51) Int. Cl.
*G03G 15/20* (2006.01)
*G03G 15/00* (2006.01)

(52) U.S. Cl.
CPC ..... *G03G 15/2039* (2013.01); *G03G 15/2017* (2013.01); *G03G 15/80* (2013.01)

(58) Field of Classification Search
CPC . G03G 15/2039; G03G 15/2017; G03G 15/80
See application file for complete search history.

(56) References Cited

U.S. PATENT DOCUMENTS 11,630,405 B1 4/2023 Tanaka
2008/0279576 A1* 11/2008 Kim .................. G03G 15/2039 399/328

(Continued)

FOREIGN PATENT DOCUMENTS

JP 2001-142349 A 5/2001
JP 2007-065413 A 3/2007

(Continued)

OTHER PUBLICATIONS

EP Search Report for EP Application No. 24159627, dated Aug. 2, 2024, pp. 1-8.

*Primary Examiner* — Stephanie E Bloss
*Assistant Examiner* — Michael A Harrison
(74) *Attorney, Agent, or Firm* — FOLEY & LARDNER LLP

(57) ABSTRACT

A temperature control device controls power supplied to a heater based on a temperature estimate value estimated over time so that a temperature control target to which heat propagates from the heater of the fixing unit reaches a preset target temperature. The temperature control device includes a temperature sensor, first and second storage circuits, a temperature difference detection circuit, and a target temperature correction circuit. The temperature sensor detects a temperature of the heater. The first storage circuit stores the temperature estimate value. The second storage circuit stores a sensor temperature. The temperature difference detection circuit calculates an actual temperature rise amount from a temperature difference between the temperature estimate value and the temperature of the heater from the respective storage circuits. The temperature correction circuit performs control such that a target temperature is lowered in accordance with the actual temperature rise amount.

20 Claims, 15 Drawing Sheets

(56) References Cited

U.S. PATENT DOCUMENTS

| | | | | |
|---|---|---|---|---|
| 2020/0150565 | A1* | 5/2020 | Masuda | G03G 15/205 |
| 2023/0145933 | A1 | 5/2023 | Usami | |

FOREIGN PATENT DOCUMENTS

| | | | |
|---|---|---|---|
| JP | 2009-103995 | A | 5/2009 |
| JP | 2017-191268 | A | 10/2017 |

* cited by examiner

FIG. 5

| ITEM | FIRST CLEARANCE C1 | SECOND CLEARANCE C2 | THIRD CLEARANCE C3 |
|---|---|---|---|
| DISTANCE BETWEEN TEMPERATURE SENSOR (CENTER) AND HEAT ROLLER | 0mm | 0.21mm | 0.42mm |
| ACTUAL TEMPERATURE CENTER OF HEAT ROLLER | 170.2 | 177.8 | 189.6 |
| SENSOR TEMPERATURE CENTER | 163 | 162 | 163 |
| TEMPERATURE ESTIMATE VALUE WAE CENTER | 172.9 | 186.4 | 203.5 |
| FIRST TEMPERATURE RISE AMOUNT CENTER | 9.9 | 24.4 | 40.5 |
| SECOND TEMPERATURE RISE AMOUNT CENTER | 7.2 | 15.8 | 26.6 |
| ACTUAL TEMPERATURE RISE AMOUNT CENTER | 0 | 8.6 | 19.4 |

FIG. 6

| ITEM | FIRST CLEARANCE S1 | SECOND CLEARANCE S2 | THIRD CLEARANCE S3 |
|---|---|---|---|
| DISTANCE BETWEEN TEMPERATURE SENSOR (SIDE) AND HEAT ROLLER | 0mm | 0.21mm | 0.42mm |
| ACTUAL TEMPERATURE SIDE OF HEAT ROLLER | 162 | 173.2 | 181.2 |
| SENSOR TEMPERATURE SIDE | 157 | 157 | 157 |
| TEMPERATURE ESTIMATE VALUE WAE SIDE | 183.6 | 209.6 | 220.7 |
| FIRST TEMPERATURE RISE AMOUNT SIDE | 26.6 | 52.6 | 63.7 |
| SECOND TEMPERATURE RISE AMOUNT SIDE | 5 | 16.2 | 24.2 |
| ACTUAL TEMPERATURE RISE AMOUNT SIDE | 0 | 11.2 | 19.2 |

FIG. 12

| ACTUAL TEMPERATURE RISE AMOUNT | FIRST TEMPERATURE RISE AMOUNT CENTER | CONTROL CORRECTION TEMPERATURE |
| --- | --- | --- |
| 0 | ta≤18.1(thC) | – |
| 5<tb≤10 | 18.1<ta≤25.9 | CENTER -5℃ |
| 10<tb≤15 | 25.9<ta≤33.8 | CENTER -10℃ |
| 15<tb≤20 | 33.8<ta≤41.7 | CENTER -15℃ |
| 20<tb | 41.7<ta | CENTER -20℃ |

FIG. 13

| ACTUAL TEMPERATURE RISE AMOUNT | FIRST TEMPERATURE RISE AMOUNT SIDE | CONTROL CORRECTION TEMPERATURE |
| --- | --- | --- |
| 0 | ta≤37.4(thS) | – |
| 5<tb≤10 | 37.4<ta≤47.3 | SIDE -5℃ |
| 10<tb≤15 | 47.3<ta≤57.3 | SIDE -10℃ |
| 15<tb≤20 | 57.3<ta≤67.2 | SIDE -15℃ |
| 20<tb | 67.2<ta | SIDE -20℃ |

TEMPERATURE CONTROL DEVICE AND IMAGE FORMING APPARATUS INCLUDING TEMPERATURE CONTROL DEVICE

CROSS-REFERENCE TO RELATED APPLICATION

This application is based upon and claims the benefit of priority from Japanese Patent Application No. 2023-090901, filed on Jun. 1, 2023, the entire contents of which are incorporated herein by reference.

FIELD

Embodiments described herein relate generally to a temperature control device and an image forming apparatus including the temperature control device.

BACKGROUND

An image forming apparatus placed on a workplace or the like includes a fixing unit that fixes a toner image to a recording medium to which the toner image was transferred by applying heat and pressure to the recording medium. The fixing unit includes a temperature sensor that detects a temperature of the surface of a heat roller (fixing member). The fixing unit performs control so that a surface temperature of the heat roller reaches a target value by increasing or decreasing an amount of power supplied to a heat member (a lamp, an IH heater, or the like) based on a detection signal of the temperature sensor.

As recognized by the inventor of the present application, when foreign matters are inserted between the temperature sensor and the heat roller or dirt of toner is adhered to the temperature sensor, the fixing unit may not detect an accurate temperature even if the temperature sensor itself is normal. When the temperature sensor cannot detect an accurate temperature, a difference may occur between a temperature of the heat roller and a temperature detected by the temperature sensor, an inappropriate target value is set, and the temperature is controlled. As a result, the temperature of the fixing unit increases, which causes hot offset and a service call, and thus the image forming apparatus cannot operate temporarily in some situations.

DESCRIPTION OF THE DRAWINGS

FIG. 5 is a diagram illustrating an actually measured temperature and a temperature of a temperature estimate value when a clearance is left at a center;

FIG. 6 is a diagram illustrating an actually measured temperature and a temperature of a temperature estimate value when a clearance is left in a side;

FIG. 12 is a diagram illustrating a correlation among an actual temperature rise amount of the heat roller, a first temperature rise amount center, and a control correction temperature;

FIG. 13 is a diagram illustrating a correlation among the actual temperature rise amount of the heat roller, a first temperature rise amount side, and the control correction temperature;

DETAILED DESCRIPTION

In general, according to at least one embodiment, provided are a temperature control device (temperature controller) and an image forming apparatus including the temperature control device that determines a failure of a detected temperature from a correlation between a calculated temperature estimate value and a sensor temperature and performs temperature control such that a target temperature is corrected to an appropriate target temperature to prevent a temperature rise of a fixing unit (fixer).

According to at least one embodiment, a temperature control device controls power supplied to a heater based on a temperature estimate value estimated over time so that a temperature control target to which heat propagates from the heater of a fixing unit reaches a preset target temperature. The temperature control device includes a temperature sensor, a first storage circuit, a second storage circuit, a temperature difference detection circuit, and a temperature correction circuit. The temperature sensor detects a temperature of the heater. The first storage circuit stores the temperature estimate value acquired at a random time. The second storage circuit stores a sensor temperature detected by the temperature sensor. The temperature difference detection circuit calculates an actual temperature rise amount from a temperature difference between the temperature estimate value read from the first storage circuit and the temperature of the heater read from the second storage circuit. The temperature correction circuit performs control such that a target temperature is lowered in accordance with the actual temperature rise amount.

Figure 1:
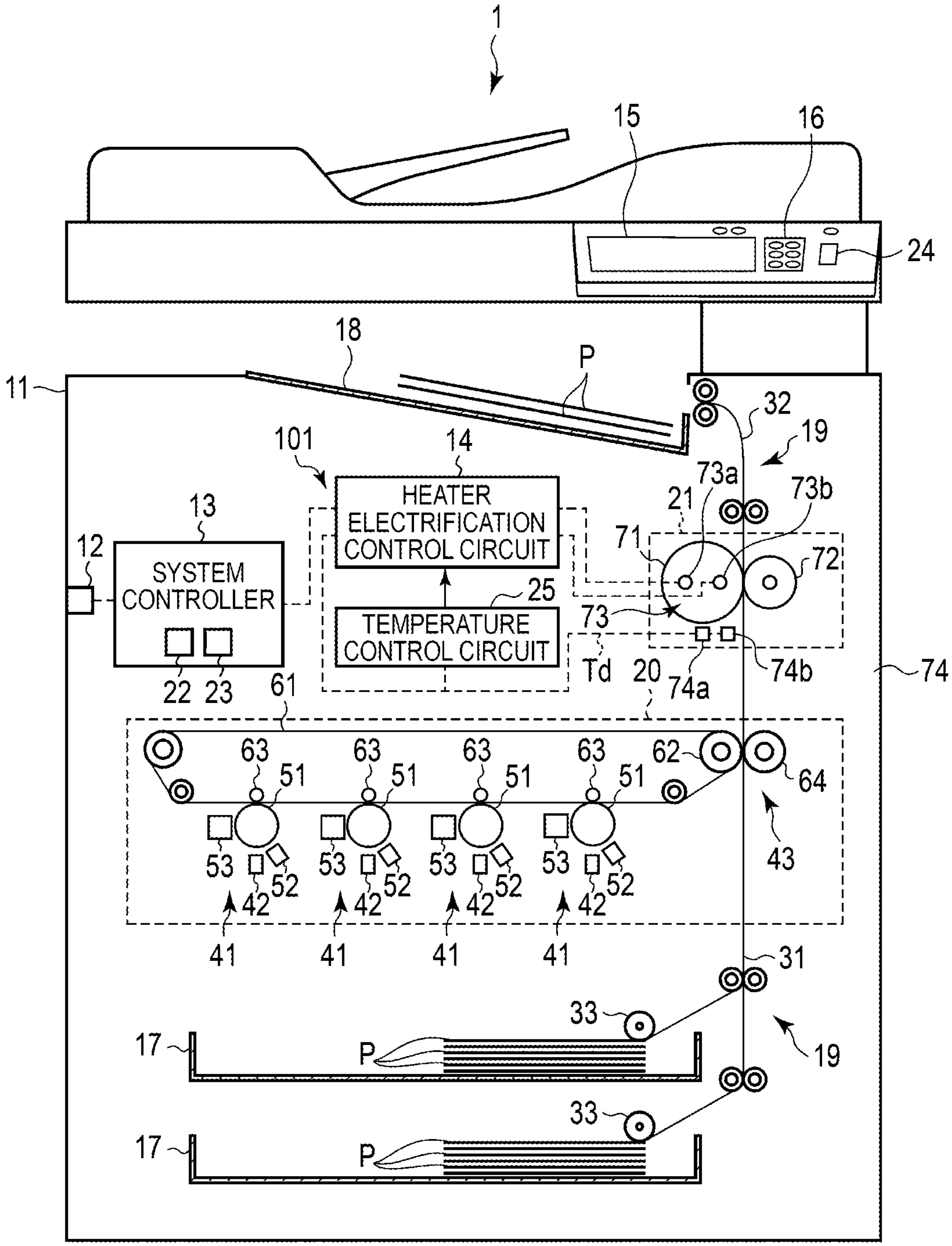
FIG. 1 is a diagram conceptually illustrating an overall configuration example of an image forming apparatus according to at least one embodiment.
Figure 2:
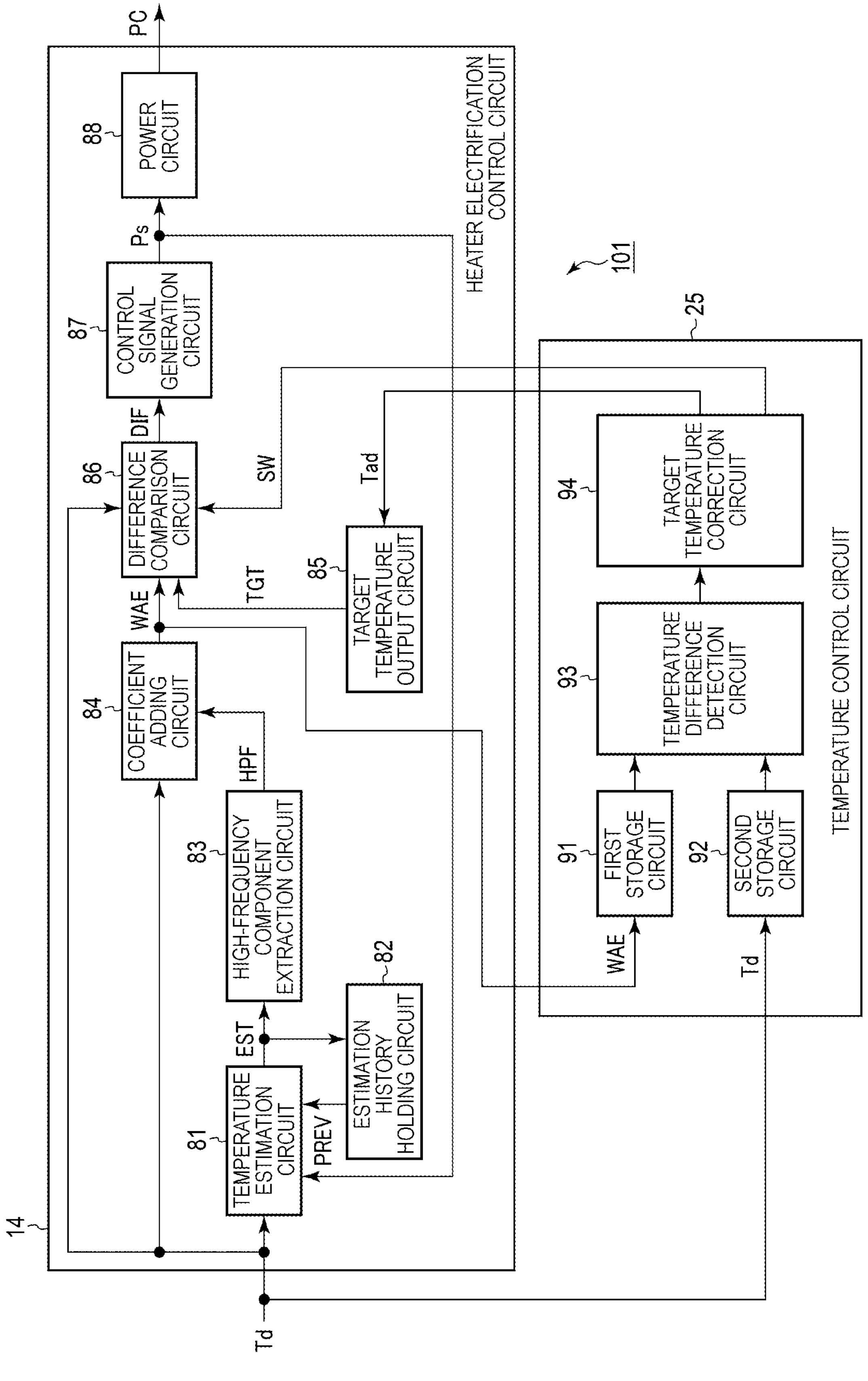
FIG. 2 is a block diagram illustrating a configuration example of a temperature control device.

Hereinafter, a temperature control device and an image forming apparatus according to an embodiment will be described with reference to the drawings. FIG. 1 is a diagram conceptually illustrating an overall configuration example of the image forming apparatus according to at least one embodiment. FIG. 2 is a block diagram illustrating a configuration example of the temperature control device.

A temperature control device 101 according to at least one embodiment performs temperature control of a fixing unit 21 mounted in an image forming apparatus 1 by selecting, as temperature control of the fixing unit 21 in cooperation with a heater electrification control circuit 14 and a temperature control circuit 25, temperature control for weighted average control with estimate temperature (WAE) control using a difference between a detected temperature of the fixing unit 21 detected by a temperature sensor 74 (sensor temperature) and a temperature estimate value WAE obtained by WAE control (first temperature control) or temperature control in accordance with a target value corrected with a correction value having the correlation with respect to the sensor temperature detected by the temperature sensor 74 (second temperature control).

The WAE control is a technique for simulating a member temperature of a temperature control target as a thermal CR circuit, as will be described below, and is temperature control using the temperature estimate value WAE of the fixing unit obtained by estimating (calculating) a surface temperature of a heat roller which is a temperature control target from a thermal capacity (C) of a heating target heat roller, a thermal resistance (R) of the fixing unit, energy input to the fixing unit, and the like.

The image forming apparatus 1 illustrated in FIG. 1 is, for example, a multifunction printer (MFP) that is disposed in a workplace or the like and performs various processes such as image forming while conveying a recording medium such as a printing sheet. The image forming apparatus 1 is a solid-state scanning type printer (for example, an LED printer) that performs various processes such as image forming while conveying a recording medium and scans an LED array. Such image forming apparatuses 1 have, for example, a configuration in which toner is received from a toner cartridge and an image is formed on the recording medium with the received toner. The toner may be monochromic toner or may be color toner of a plurality of colors such as cyan, magenta, yellow, and black. The toner may be decolorable toner which is decolored when heat is applied after printing.

As illustrated in FIG. 1, the image forming apparatus 1 includes a casing 11, a communication interface 12, a system controller 13, the heater electrification control circuit 14, a display unit 15, an operation interface 16, a plurality of sheet trays 17, a discharge tray 18, a conveyance unit 19, an image forming unit 20, the fixing unit 21, a main power switch 24, and the temperature control circuit 25.

The casing 11 is a body of the image forming apparatus 1. The casing 11 houses the communication interface 12, the system controller 13, the display unit 15, the operation interface 16, the plurality of sheet trays 17, the discharge tray 18, the conveyance unit 19, the image forming unit 20, the fixing unit 21, the heater electrification control circuit 14, and the temperature control circuit 25. The temperature control device 101 to be described below is configured using the heater electrification control circuit 14, the temperature control circuit 25, and the temperature sensor 74 of the fixing unit 21.

First, a configuration of a control system of the image forming apparatus 1 will be described.

The communication interface 12 is a connection device that enables communication with an external peripheral apparatus (host apparatus or the like). The communication interface 12 includes, for example a network connection terminal for wired connection by a LAN connector or the like. Further, the communication interface 12 may have a function of performing wireless communication with another apparatus in conformity with a standard such as Bluetooth (registered trademark) or Wi-Fi (registered trademark).

The system controller 13 controls the image forming apparatus 1. The system controller 13 includes, for example, a processor 22 and a memory 23.

As the memory 23, a read-only nonvolatile memory such as a read only memory (ROM), a nonvolatile memory such as a flash ROM, a solid state drive (SSD), a hard disk drive (HDD) capable of performing writing and reading as necessary, or a volatile memory such as a random access memory (RAM) capable of performing writing and reading as necessary can be applied and the above-described memories can be appropriately combined and used. The memory 23 stores a program and data or the like used for the program. The memory 23 also functions as a working memory. That is, the memory 23 temporarily stores data which is being processed by the processor 22, a program which is executed by the processor 22, and the like.

The processor 22 is, for example, an arithmetic circuit that includes an arithmetic element such as a central processing unit (CPU). The processor 22 functions as a control unit that performs various operations by executing the program stored in the memory 23. The processor 22 performs various arithmetic processes and processes related to determination using the data stored in the memory 23.

Further, for example, the processor 22 generates a printing job based on an image acquired from an external apparatus via the communication interface 12. The processor 22 stores the generated printing job in the memory 23. The printing job includes image data indicating an image to be formed on a recording medium P. The image data may be data for forming an image on one recording medium P or may be data for forming an image on the plurality of recording media P. Further, the printing job includes information indicating color printing or monochromic printing. Furthermore, the printing job may include information such as the number of printing copies (the number of page sets) or the number of prints (the number of pages) per copy.

The processor 22 generates printing control information for controlling operations of the conveyance unit 19, the image forming unit 20, and the fixing unit 21 based on the generated printing job. The printing control information includes information indicating a timing of paper feeding. The processor 22 transmits the printing control information to the heater electrification control circuit 14.

Further, the processor 22 functions as a controller (engine controller) that controls operations of the conveyance unit 19 and the image forming unit 20 by executing the program stored in the memory 23. That is, the processor 22 performs control of conveyance of the recording medium P by the conveyance unit 19, control of forming of an image on the recording medium P by the image forming unit 20, and the like. Further, the processor 22 can also perform temperature control of the fixing unit 21 by performing a function equivalent to a control operation by the heater electrification control circuit 14 and the temperature control circuit 25 through program processing instead of the heater electrification control circuit 14 and the temperature control circuit 25.

The image forming apparatus 1 may individually include an engine controller and the system controller 13. In this case, the engine controller performs control of conveyance of the recording medium P by the conveyance unit 19, control of forming of an image on the recording medium P by the image forming unit 20, and the like. In this case, the system controller 13 supplies information necessary for a control operation to the engine controller.

The image forming apparatus 1 includes a power conversion circuit that supplies a direct-current voltage to each constituent unit in the image forming apparatus 1 using an alternating-current voltage of an alternating-current power supply AC. The power conversion circuit supplies a direct-current voltage necessary for the operation of the processor 22 and the memory 23 to the system controller 13. The power conversion circuit supplies a direct-current voltage necessary to form an image to the image forming unit 20. The power conversion circuit supplies a direct-current voltage necessary to convey a recording medium to the conveyance unit 19. The power conversion circuit supplies a direct-current voltage for driving of the heater 73 of the fixing unit 21 to the heater electrification control circuit 14. The heater 73 is a heating element. For example, a lamp heater or the like is applied.

The heater electrification control circuit 14 generates power PC and supplies the power PC to the heater 73 of the fixing unit 21. The heater electrification control circuit 14 belongs to constituent elements of the temperature control device 101 according to at least one embodiment. The details of the heater electrification control circuit 14 will be described below.

The temperature control circuit 25 performs control on the heater electrification control circuit 14 to be described below such that a target temperature of the fixing unit 21 is corrected.

The display unit 15 includes a display that displays a screen in response to a video signal input from the system controller 13. Instead of the system controller 13, a graphic controller or the like may be used. For example, a screen for various settings of the image forming apparatus 1 is displayed on the display of the display unit 15.

The main power switch 24 is a switch that performs supply or cutoff of power for driving the image forming apparatus 1 through an ON or OFF operation. The image forming apparatus 1 starts up through an ON operation of the main power switch 24 and driving of the image forming apparatus 1 is stopped through an OFF operation. The fixing unit 21 also starts up or stops through the ON or OFF operation of the main power switch 24.

The operation interface 16 is connected to an operation member to be described below. The operation interface 16 supplies the system controller 13 with an operation signal in response to an operation of the operation member. The operation member is, for example, a touch sensor, a ten key pad, a sheet feeding key, various function keys, a keyboard, or the like. The touch sensor acquires information indicating a position designated in a certain region. The touch sensor is configured as a touch panel integrated with the display unit 15, so that a signal indicating a position touched on the screen displayed on the display unit 15 is input to the system controller 13.

The plurality of sheet trays 17 are cassettes that are detachably mounted on the casing 11 and accommodate the recording media P with the same size or different sizes in units of cassettes. The sheet tray 17 supplies the recording medium P to the conveyance unit 19. The discharge tray 18 is a tray that supports the recording medium P discharged from the image forming apparatus 1.

Next, a heater unit in the fixing unit 21 of the image forming apparatus 1 will be described.

Figure 3:
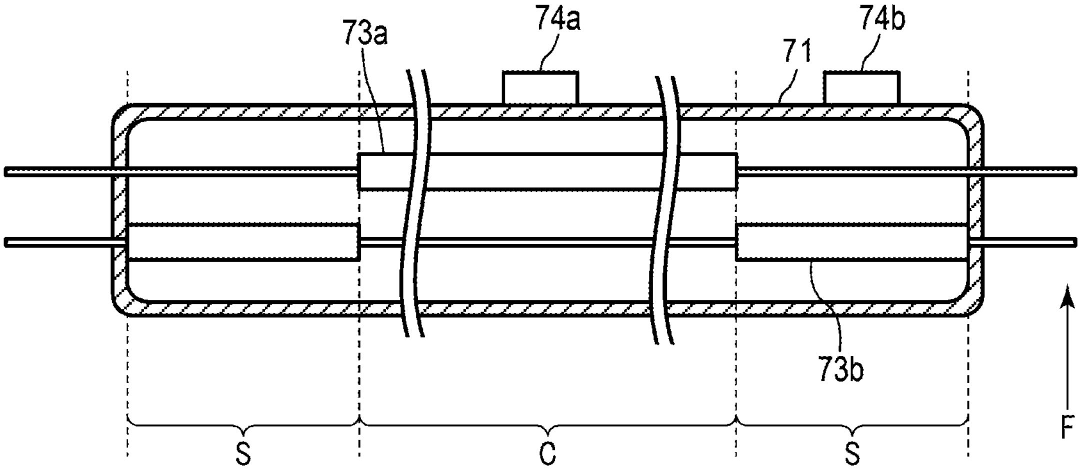
FIG. 3 is a diagram illustrating a configuration example of a heater unit in a fixing unit.

FIG. 3 is a diagram illustrating a configuration example of a heater unit in the fixing unit 21.

In the heater unit, the heater 73 is configured with heating elements serving as a plurality of heat sources that generate heat by power supplied from the heater electrification control circuit 14. The heater 73 in the fixing unit 21 of the first configuration example illustrated in FIGS. 1 and 3 includes a center heater 73*a* and a side heater 73*b* as two heat sources (heating elements). As the center heater 73*a* and the side heater 73*b*, for example, a halogen heater, a lamp heater, an IH heater, a resistance heater, or the like can be used.

The heater 73 in the fixing unit 21 includes two heaters including the center heater 73*a* and the side heater 73*b*. The center heater 73*a* heats a center portion (center region C) in a rotational axis direction in the heat roller 71. The side heater 73*b* heats a peripheral portion (side region S) other than the center portion in the rotational axis direction of the heat roller 71. A recording medium P is conveyed in a conveyance direction F illustrated in FIG. 3. For example, lengths of the center region C and the side region may be set in accordance with a size of a medium used as the recording medium P.

The center heater 73*a* and the side heater 73*b* each generate heat by power supplied through control of the system controller 13. Consumption power of the center heater 73*a* and the side heater 73*b* is, for example, 600 W.

The system controller 13 heats the center region C of the heat roller 71 when a fixing process is performed on the recording medium P having a narrow width in the rotational axis direction (the conveyance direction F of the recording medium P) of the heat roller 71. When the center region C of the heat roller 71 is heated, the system controller 13 performs power supply to the center heater 73*a* by the heater electrification control circuit 14 and stops the power supply to the side heater 73*b*.

The system controller 13 heats the entire heat roller 71 (both the center region C and the side region S) when the fixing process is performed on the recording medium P having a wide width in the rotational axis direction (the conveyance direction F of the recording medium P) of the heat roller 71. When the entire heat roller 71 is heated, the system controller 13 causes the heater electrification control circuit 14 to operate both the center heater 73*a* and the side heater 73*b*.

Temperature sensors 74*a* and 74*b* have contact portions (detection portions) coming into contact with the surface of the heat roller 71 and detect temperatures of portions with which the contact portions come into contact. The temperature sensors 74*a* and 74*b* are, for example, thermistors. The temperature sensors 74*a* and 74*b* are arranged in parallel to a rotational axis of the heat roller 71. In the first configuration example illustrated in FIG. 3, the temperature sensor 74*a* detects a temperature of the center region (a center portion in the case of three partitions in the rotational axis direction) C in the rotational axis direction of the heat roller

71. The temperature sensor 74*b* detects a temperature of the side region (either side portion in the case of three partitions in the rotational axis direction) S in the rotational axis direction of the heat roller 71.

Each of the temperature sensors 74*a* and 74*b* has the contact portion (detection portion) coming into contact with the surface of the heat roller 71. In the temperature sensor 74*a*, the detection portion comes into contact with the surface of the center region C of the heat roller 71 to detect a temperature of the center region C of the heat roller 71. In the temperature sensor 74*b*, the detection portion comes into contact with the surface of the side region S of the heat roller 71 to detect a temperature of the side region S of the heat roller 71.

Each of the temperature sensors 74*a* and 74*b* supplies a temperature detection result signal indicating a temperature detection result to the temperature control circuit 25 and the heater electrification control circuit 14. When the center region C of the heat roller 71 is heated, the heater electrification control circuit 14 operates the center heater 73*a* based on the temperature detected by the temperature sensor 74*a*. When the entire heat roller 71 is heated, the system controller 13 operates the center heater 73*a* and the side heater 73*b* based on the temperatures detected by the temperature sensors 74*a* and 74*b*.

Next, a configuration for conveying the recording medium P of the image forming apparatus 1 will be described.

The conveyance unit 19 is a mechanism that conveys the recording medium P inside the image forming apparatus 1. As illustrated in FIG. 1, the conveyance unit 19 includes a plurality of conveyance paths. For example, the conveyance unit 19 includes a feed conveyance path 31 and a discharge conveyance path 32.

Each of the feed conveyance path 31 and the discharge conveyance path 32 includes a plurality of motors, a plurality of rollers, and a plurality of guides. The plurality of motors rotate shafts to rotate the rollers driven by the rotation of the shafts based on control of the system controller 13. The plurality of rollers are rotated to move the recording medium P. The plurality of guides prevent oblique movement of the recording medium P during conveyance.

Along the feed conveyance path 31, the recording medium P is picked up from each sheet tray 17 by a pickup roller 33 and the picked-up recording medium P is supplied to the image forming unit 20.

The discharge conveyance path 32 is a conveyance path along which the recording medium P on which an image was formed is discharged from the casing 11. The recording medium P discharged through the discharge conveyance path 32 is accommodated in the discharge tray 18.

Next, the image forming unit 20 will be described.

The image forming unit 20 forms an image on the recording medium P based on the printing job generated by the processor 22. The image forming unit 20 includes a plurality of process units 41, a plurality of exposure units 42, and a transfer mechanism 43. The image forming unit 20 includes the exposure unit 42 for each process unit 41. The plurality of process units 41 and the plurality of exposure units 42 have the same configurations.

First, the process unit 41 will be described.

In the process unit 41, toner cartridges that supply toner of different colors are connected and a toner image is formed. The plurality of process units 41 are provided for each color of the toner and correspond to, for example, color toner of cyan, magenta, yellow, and black. The toner cartridge includes a toner storage container and a toner sending mechanism. The toner storage container is a container that supplies the stored toner. The toner sending mechanism is a mechanism configured with a screw or the like sending the toner in the toner storage container.

Hereinafter, a set including the process unit 41 and the exposure unit 42 will be described as a representative example.

The process unit 41 includes a photosensitive drum 51, an electrostatic charger 52, and a developing unit 53.

The photosensitive drum 51 is a photoreceptor that includes a cylindrical drum and a photosensitive layer formed on the outer circumferential surface of the drum. The photosensitive drum 51 is rotated at a constant speed by a driving mechanism configured using a gear, a belt, or the like.

The electrostatic charger 52 uniformly charges the surface of the photosensitive drum 51. For example, the electrostatic charger 52 charges the photosensitive drum 51 with a uniform negative polarity potential (contrast potential) by applying a voltage (developing bias voltage) to the photosensitive drum 51 using a charging roller. The charging roller is driven by rotation of the photosensitive drum 51 to rotate in a state in which a predetermined pressure is applied to the photosensitive drum 51.

The developing unit 53 is a device that attaches the toner to the photosensitive drum 51. The developing unit 53 includes a developer container, a stirring mechanism, a developing roller, a doctor blade, and an automatic toner control (ATC) sensor. The developer container is a container that receives and stores the toner sent from the toner cartridge. Carriers are stored in advance inside the developer container. The toner sent from the toner cartridge is stirred with the carriers by the stirring mechanism to form developer in which the toner and the carriers are mixed. The carriers are stored inside the developer container when the developing unit 53 is manufactured.

Of above-described units, the developing roller is rotated inside the developer container to attach the developer to the surface. The doctor blade is a member disposed away from the surface of the developing roller at a predetermined clearance. The doctor blade partially removes the apex portion of the developer attached to the surface of the rotating developing roller. Accordingly, a layer of the developer with a constant thickness is formed on the surface of the developing roller in accordance with a clearance between the doctor blade and the surface of the developing roller.

The ATC sensor is, for example, a magnetic flux sensor that has a coil and detects a voltage value generated in the coil. A detected voltage of the ATC sensor is changed in accordance with density of a magnetic flux from the toner inside the developing container. That is, the system controller 13 determines a density ratio of the toner remaining in the developer container to the carriers (toner density ratio) based on the detected voltage of the ATC sensor. The system controller 13 operates the motor driving the sending mechanism of the toner cartridge based on the toner density ratio and sends the toner to the developing container of the developing unit 53 from the toner cartridge.

Next, the exposure unit 42 will be described.

The exposure unit 42 includes a plurality of light-emitting elements. The exposure unit 42 forms a latent image on the photosensitive drum 51 by irradiating the charged photosensitive drum 51 with light from the light-emitting element. The light-emitting element is, for example, a light-emitting diode (LED) or the like. One light-emitting element is configured to irradiate one point on the photosensitive drum 51 with the light. The plurality of light-emitting elements are arranged in a main scanning direction which is a direction parallel to a rotational axis of the photosensitive drum 51.

The exposure unit 42 forms a latent image corresponding to one line on the photosensitive drum 51 by irradiating the photosensitive drum 51 with light from the plurality of light-emitting elements arranged in the main scanning direction. Further, the exposure unit 42 forms latent images of a plurality of lines by consecutively irradiating the rotating photosensitive drum 51 with the light.

In the process unit 41 that has the above-described configuration, an electrostatic latent image is formed when the surface of the photosensitive drum 51 charged by the electrostatic charger 52 is irradiated with light from the exposure unit 42. Further, when a layer of the developer formed on the surface of the developing roller approaches the surface of the photosensitive drum 51, the toner included in the developer is attached to the latent image formed on the surface of the photosensitive drum 51. Accordingly, a toner image is formed on the surface of the photosensitive drum 51.

Next, the transfer mechanism 43 will be described.

The transfer mechanism 43 transfers the toner image formed on the surface of the photosensitive drum 51 to the recording medium P. The transfer mechanism 43 includes, for example, a primary transfer belt 61, a secondary transfer counter roller 62, a plurality of primary transfer rollers 63, and a secondary transfer roller 64.

The primary transfer belt 61 is an endless belt wound around the secondary transfer counter roller 62 and a plurality of winding rollers. In the primary transfer belt 61, an inner surface (inner circumferential surface) comes into contact with the secondary transfer counter roller 62 and the plurality of winding rollers, and an outer surface (outer circumferential surface) faces the photosensitive drum 51 of the process unit 41.

The secondary transfer counter roller 62 is rotated using the motor as a driving source. The secondary transfer counter roller 62 is rotated to convey the primary transfer belt 61 in a predetermined conveyance direction. The plurality of winding rollers are configured to be rotatable freely. The plurality of winding rollers are rotated with movement of the primary transfer belt 61 by the secondary transfer counter roller 62.

Each of the plurality of primary transfer rollers 63 brings the primary transfer belt 61 into contact with the photosensitive drum 51 of the process unit 41. Specifically, each of the plurality of primary transfer rollers 63 is provided at a position facing the photosensitive drum 51 of the corresponding process unit 41 with the primary transfer belt 61 interposed therebetween. The primary transfer rollers 63 come into contact with the inner circumferential surface of the primary transfer belt 61 to displace the primary transfer belt 61 toward the photosensitive drum 51. Accordingly, the primary transfer rollers 63 bring the outer circumferential surface of the primary transfer belt 61 in contact with the photosensitive drums 51.

The secondary transfer roller 64 is provided at a position facing the secondary transfer counter roller 62 with the primary transfer belt 61 interposed therebetween. The secondary transfer roller 64 comes into contact with the outer circumferential surface of the primary transfer belt 61 and applies a pressure. Accordingly, a transfer nip in which the secondary transfer roller 64 and the outer circumferential surface of the primary transfer belt 61 are closely contacted is formed. When the recording medium P passes, the secondary transfer roller 64 presses the recording medium P passing through the transfer nip against the outer circumferential surface of the primary transfer belt 61.

The secondary transfer roller 64 and the secondary transfer counter roller 62 are rotated to convey the recording medium P supplied from the feed conveyance path 31 with the recording medium P interposed therebetween. Accordingly, the recording medium P passes through the transfer nip.

When the outer circumferential surface of the primary transfer belt 61 comes into contact with photosensitive drum 51, the transfer mechanism 43 that has the above-described configuration transfers the toner image formed on the surface of the photosensitive drum to the outer circumferential surface of the primary transfer belt 61. When the image forming unit 20 includes the plurality of process units 41, the primary transfer belt 61 transfers the toner images from the photosensitive drums 51 of the plurality of process units 41 to the outer circumferential surface. The primary transfer belt 61 conveys the transferred toner images to the transfer nip in which the secondary transfer roller 64 and the outer circumferential surface of the primary transfer belt 61 are closely contacted. When the recording medium P exists in the transfer nip, the toner images transferred to the outer circumferential surface of the primary transfer belt 61 are transferred to the recording medium P in the transfer nip.

The fixing unit 21 fixes the toner images to the recording medium P to which the toner images were transferred. The fixing unit 21 operates based on control of the system controller 13 and the temperature control device 101. The fixing unit 21 includes the temperature sensors 74, the heat roller 71, a pressurization roller 72, and a heater unit 76 as described above. The heat roller 71 is rotated by a driving source such as a motor. The heater 73 generates heat by the power PC supplied from the heater electrification control circuit 14. The plurality of temperature sensors 74 (74*a* and 74*b*) are arranged in parallel to the rotational axis of the heat roller 71 and detect temperatures of the heat roller 71. The temperature sensors 74 are, for example, sensor elements such as contact type thermistors and may, of course, be other temperature sensors. In the embodiment, an average value per setting time (or unit time) of a detection signal output from the temperature sensor 74 is used as one detection signal.

Next, the temperature control device 101 will be described with reference to FIGS. 1 and 2.

The temperature control device 101 includes the heater electrification control circuit 14, the temperature control circuit 25, and the temperature sensor 74. In this example, the temperature control circuit 25 is independently provided as an arithmetic processing circuit as an example, but an embodiment is particularly not limited. The temperature control circuit 25 may be provided in the processor 22 of the system controller 13 of the image forming apparatus 1 or may be provided inside another control circuit. A sensor temperature Td detected by the temperature sensor 74 is input to the heater electrification control circuit 14.

The heater electrification control circuit 14 generates the power PC and supplies the power PC to the heater 73 of the fixing unit 21. An amount of heat generated by the heater 73 in accordance with a power amount of the power PC is adjusted to control a temperature of the heat roller 71. The heater electrification control circuit 14 adjusts a power amount to the heater 73 of the fixing unit 21 based on the sensor temperature Td, a temperature estimation history PREY, and an electrification pulse Ps. This control is also referred to as a weighted average control with estimate temperature (WAE) control. The heater electrification control circuit 14 includes a temperature estimation circuit 81, an estimation history holding circuit 82, a high-frequency component extraction circuit 83, a coefficient adding circuit 84, a target temperature output circuit 85, a difference comparison circuit 86, a control signal generation circuit 87, and a power circuit 88. The temperature estimation circuit 81, the estimation history holding circuit 82, the high-frequency component extraction circuit 83, the coefficient adding circuit 84, the target temperature output circuit 85, the difference comparison circuit 86, and the control signal generation circuit 87 of the heater electrification control circuit 14 may be configured with electric circuits or may be configured with software (program) to be executed by a computer.

The temperature estimation circuit 81 performs a temperature estimation process of estimating a temperature of the surface of the heat roller 71. The temperature estimation circuit 81 generates a temperature estimation result EST based on the sensor temperature Td, the estimation history PREV, and the electrification pulse Ps. The temperature estimation result EST is output to the high-frequency component extraction circuit 83.

The estimation history holding circuit 82 holds a history of the temperature estimation result EST. The estimation history holding circuit 82 outputs the estimation history PREV which is a history of the temperature estimation result EST (past temperature estimation result EST) to the temperature estimation circuit 81.

The high-frequency component extraction circuit 83 performs highpass filter process for extracting a high-frequency component of the temperature estimation result EST. The high-frequency component extraction circuit 83 outputs a high-frequency component HPF which is a signal indicating the extracted high-frequency component to the coefficient adding circuit 84.

The coefficient adding circuit 84 performs a coefficient adding process as correction on the sensor temperature Td from the temperature sensor 74. To the coefficient adding circuit 84, the sensor temperature Td is input and the high-frequency component HPF is input from the high-frequency component extraction circuit 83. The coefficient adding circuit 84 corrects the sensor temperature Td based on the high-frequency component HPF. Specifically, the coefficient adding circuit 84 multiplies the high-frequency component HPF by a preset coefficient and adds an obtained value to the sensor temperature Td to calculate the temperature estimate value WAE. The coefficient adding circuit 84 outputs the temperature estimate value WAE to the difference comparison circuit 86.

The target temperature output circuit 85 outputs a preset target temperature TGT to the difference comparison circuit 86.

The difference comparison circuit 86 performs a difference calculation process. The difference comparison circuit 86 calculates a difference DIF between the target temperature TGT from the target temperature output circuit 85 and the estimate value WAE from the coefficient adding circuit 84, and outputs the difference DIF to the control signal generation circuit 87. When a control switching signal SW from a target temperature correction circuit 94 of the temperature control circuit 25 to be described below is received, the difference comparison circuit 86 calculates the difference DIF between the sensor temperature Td from the temperature sensor 74 and the target temperature TGT instead of the difference between the target temperature TGT and the estimate value WAE, and outputs the difference DIF to the control signal generation circuit 87.

Based on the difference DIF, the control signal generation circuit 87 generates the electrification pulse Ps which is a pulse signal for controlling electrification to the heater 73. The control signal generation circuit 87 outputs the electrification pulse Ps to the power circuit 88 and the temperature estimation circuit 81.

Based on the electrification pulse Ps, the power circuit 88 supplies the power PC to the heater 73. The power circuit 88 performs electrification to the heater 73 of the fixing unit 21 using a supplied direct-current voltage. For example, based on the electrification pulse Ps, the power circuit 88 supplies the power PC to the heater 73 by switching between a supply state of the direct-current voltage to the heater 73 and a non-supply state of the direct-current voltage to the heater 73. That is, the power circuit 88 varies a time of electrification to the heater 73 of the fixing unit 21 in accordance with the electrification pulse Ps.

The power circuit 88 may be integrated with the fixing unit 21. That is, the heater electrification control circuit 14 may not supply the power PC to the heater 73 but may supply the electrification pulse Ps to a power circuit of the heater 73 of the fixing unit 21.

Next, the temperature control circuit 25 includes a first storage circuit 91, a second storage circuit 92, a temperature difference detection circuit 93, and the target temperature correction circuit 94. An arithmetic process by each circuit included in the temperature control circuit 25 can be replaced with a program executing such an arithmetic process. The processor can execute instructions stored in a non-transitory computer-readable memory of the system controller 13. The program can be processed by the processor 22 in which the system controller 13 is mounted and a process (temperature control and target temperature correction) equal to that of each constituent unit of the temperature control circuit 25 to be described below can be performed.

In such a configuration, the first storage circuit 91 stores the temperature estimate value WAE output from the coefficient adding circuit 84 in the WAE control to be described below. The second storage circuit 92 stores the sensor temperature Td detected by the temperature sensor 74. The temperature difference detection circuit 93 estimates an actual temperature rise amount from a temperature difference between the temperature estimate value WAE read from the first storage circuit 91 and the sensor temperature Td of the heater 73 read from the second storage circuit 92.

Figure 11:
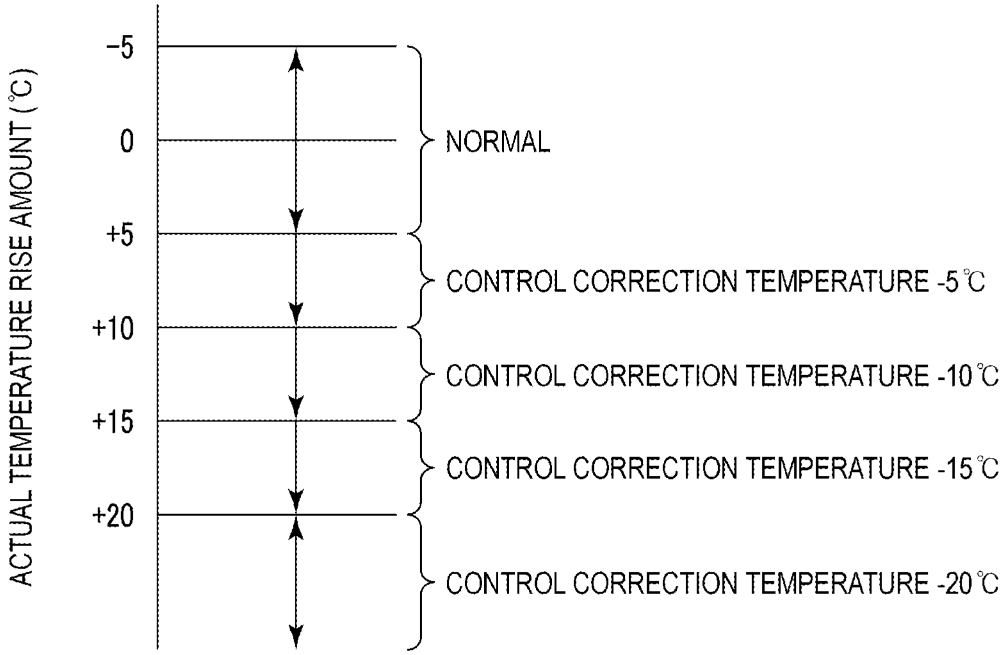
FIG. 11 is a diagram illustrating setting of a control correction temperature with respect to an actual temperature rise amount of the heat roller.

The target temperature correction circuit 94 outputs the control switching signal SW to the difference comparison circuit 86 and estimates a control correction temperature based on a correlation to be described below from the temperature rise amount, and outputs a correction target temperature Tad obtained by dropping a present target temperature to the target temperature output circuit 85. Specifically, the target temperature correction circuit 94 sets a plurality of control correction temperature, as illustrated in FIG. 11, correlated to an actual temperature rise amount including a difference between a temperature of a normal temperature control target during a temperature rise of the heater 73 and a present actual temperature of a temperature control target which is a control target. The correction target temperature Tad corrected by subtracting a control correction temperature (−5° C.~) in accordance with the actual temperature rise amount from the presently set target temperature is generated. The target temperature output circuit 85 outputs the target temperature TGT including the correction target temperature Tad to the difference comparison circuit 86.

[WAE Control]

Figure 4:
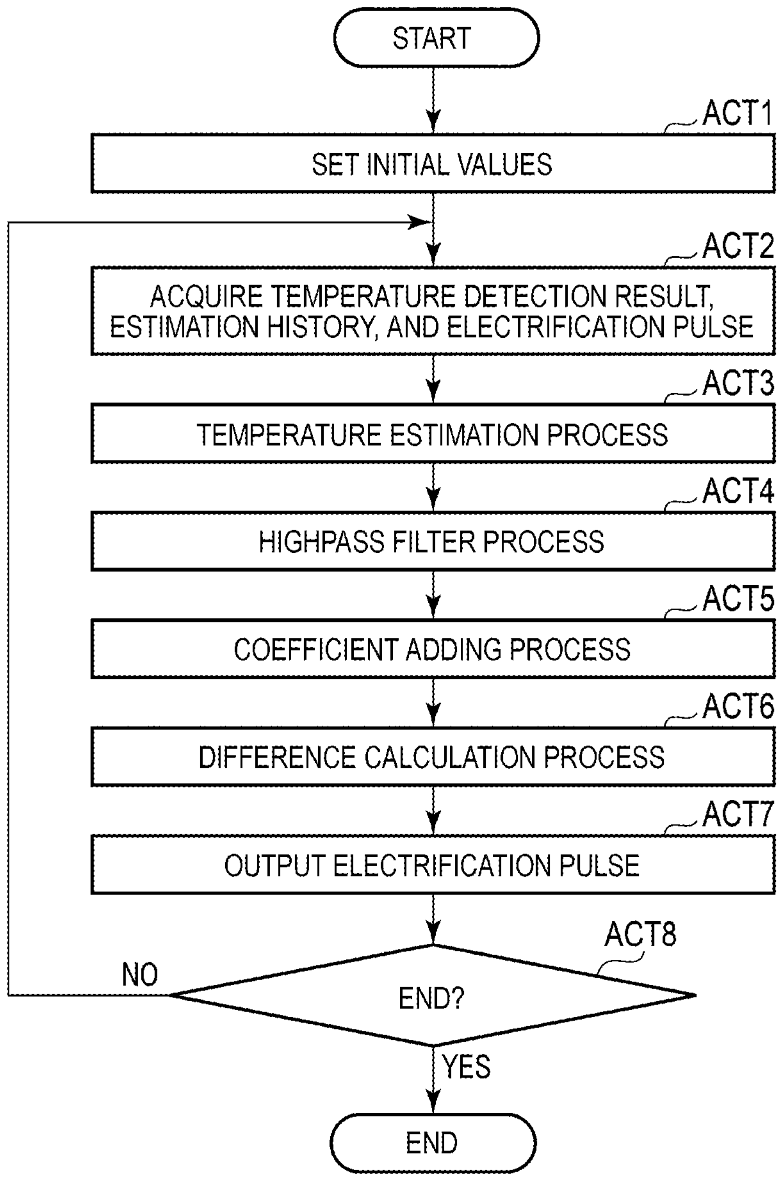
FIG. 4 is a flowchart illustrating a weighted average with estimate of temperature (WAE) control.

Next, the WAE control will be described in detail with reference to the flowchart illustrated in FIG. 4.

The heater electrification control circuit 14 sets various initial values (ACT1). For example, the heater electrification control circuit 14 sets a coefficient in the coefficient adding circuit 84, the target temperature TGT of the target temperature output circuit 85, and the like based on a signal from the system controller 13.

The temperature estimation circuit 81 of the heater electrification control circuit 14 acquires the sensor temperature Td from the temperature sensor 74, the estimation history PREV from the estimation history holding circuit 82, and the electrification pulse Ps from the control signal generation circuit 87 (ACT2). The temperature sensor 74 detects the sensor temperature Td detected or smoothed in a delay state of the sensor temperature Td with respect to a roller temperature estimate value when responsivity of a temperature change is delayed due to an influence of own thermal capacity or a characteristic of a thermosensitive material.

Subsequently, the temperature estimation circuit 81 performs a temperature estimation process (ACT3). That is, the temperature estimation circuit 81 generates the temperature estimation result EST based on the sensor temperature Td, the estimation history PREV, and the electrification pulse Ps. The temperature estimation circuit 81 outputs the temperature estimation result EST to the high-frequency component extraction circuit 83 and the estimation history holding circuit 82.

In general, movement of heat can be expressed equivalently with a CR time constant of an electric circuit. The thermal capacity is replaced with a capacitor C. Resistance of heat transmission is replaced with a resistor R. A heat source is replaced with a direct-current voltage supply. The temperature estimation circuit 81 applies an amount of electrification to the heater 73, a thermal capacity of the heat roller 71, and the like to the CR circuit in which a value of each element is set in advance to estimate the amount of heat given to the heat roller 71. The temperature estimation circuit 81 estimates the surface temperature of the heat roller 71 based on the amount of heat given to the heat roller 71, the sensor temperature Td, and the estimation history PRE, and outputs the temperature estimation result EST.

In the temperature estimation circuit 81, electrification and cutoff from the direct-current voltage supply are repeated based on the electrification pulse Ps, the CR circuit operates in accordance with the input voltage pulse, and an output voltage is generated. Accordingly, it is possible to estimate the heat propagating to the surface of the heat roller 71 which is a temperature control target. That is, as the temperature estimation result EST output by the temperature estimation circuit 81, the actual surface temperature of a heating member is estimated from the thermal capacity (C) of the heating member, the thermal resistance (R) of the fixing unit, energy input to the fixing unit, and the like. The temperature estimation result EST increases when the surface temperature of the heat roller 71 is heated and the temperature rises due to an increase in the input energy (supplied power). The heat of the heat roller 71 flows out to an external environment via a space (a circuit outside of the heat roller 71) inside the fixing unit 21. Therefore, the temperature estimation circuit 81 further includes a CR circuit that estimates an outflow of the heat from the heat roller 71 to the external environment. The temperature estimation circuit 81 may further include a CR circuit that estimates the amount of heat flowing in the space inside the fixing unit 21 from the heat roller 71.

The high-frequency component extraction circuit 83 performs the highpass filter process to extract a high-frequency component of the temperature estimation result EST (ACT4). The high-frequency component HPF which is a signal indicating a high-frequency component of the temperature estimation result EST follows a change in an actual surface temperature of the heat roller 71.

Subsequently, the coefficient adding circuit 84 performs a coefficient adding process which is correction on the sensor temperature Td (ACT5). The coefficient adding circuit 84 multiplies the high-frequency component HPF by a preset coefficient, adds the high-frequency component HPF multiplied by the coefficient to the sensor temperature Td, and calculates the temperature estimate value WAE. For example, when the coefficient is 1, the coefficient adding circuit 84 directly adds the high-frequency component HPF to the sensor temperature Td. For example, when the coefficient is 0.1, the coefficient adding circuit 84 adds a value of 1/10 of the high-frequency component HPF to the sensor temperature Td. In this case, the effect of the high-frequency component HPF is almost lost and the temperature is close to the sensor temperature Td. For example, when the coefficient is 1 or more, the effect of the high-frequency component HPF can be more strongly expressed. The coefficient set in the coefficient adding circuit 84 is not an excessively extreme value and there is an experiment result in which a value near 1 is good.

In the WAE control, a minute temperature change of the surface temperature of the heat roller 71 is estimated based on the sensor temperature Td and the high-frequency component HPF of the temperature estimation result EST. The temperature estimate value WAE is a value that appropriately follows the surface temperature of the heat roller 71.

The difference comparison circuit 86 calculates the difference DIF between the target temperature TGT including the correction control temperature Tad from the target temperature output circuit 85 and the temperature estimate value WAE from the coefficient adding circuit 84, and outputs the difference DIF to the control signal generation circuit 87 (ACT6).

The control signal generation circuit 87 generates the electrification pulse Ps based on the difference DIF. The control signal generation circuit 87 outputs the electrification pulse Ps to the power circuit 88 and the temperature estimation circuit 81 (ACT7). The power circuit 88 supplies the power PC to the heater 73 based on the electrification pulse Ps.

The above-described difference DIF represents a relation between the target temperature TGT and the temperature estimate value WAE. For example, when the relation satisfies the temperature estimate value WAE>the target temperature TGT, controls is performed such that a width of the electrification pulse Ps is narrowed or a frequency of the electrification pulse Ps is reduced, and thus the amount of electrification to the heater 73 decreases and the surface temperature of the heat roller decreases. Conversely, when the relation satisfies the temperature estimate value WAE<the target temperature TGT, controls is performed such that the width of the electrification pulse Ps is widened or the frequency of the electrification pulse Ps is raised, and thus the amount of electrification to the heater 73 increases and the surface temperature of the heat roller increases.

It can be ascertained with the difference DIF not only a magnitude relation between the temperature estimate value WAE and the target temperature TGT and how much the temperature estimate value WAE and the target temperature TGT are distant. For example, when the difference DIF (an absolute value of the difference DIF) is a large value, a divergence between the temperature estimate value WAE and the target temperature TGT is large. Therefore, the above-described control may be greatly changed. For example, when the difference DIF (an absolute value of the difference DIF) is a small value, the divergence between the temperature estimate value WAE and the target temperature TGT is small. Therefore, the foregoing control may be gently performed.

The processor 22 of the system controller 13 determines whether to end the WAE control (ACT8). When it is determined in ACT8 not to end the WAE control to continue the control (NO in ACT8), the processor 22 moves to the above-described process of ACT2. Conversely, when it is determined to end the WAE control (YES in ACT8) along with the stop of the device by the OFF operation of the main power switch 24, the processor ends a processing routine.

In this way, when a process of a certain cycle (the concerned cycle) is performed, the heater electrification control circuit 14 performs the WAE control based on values of an immediately previous cycle (the electrification pulse PS and the temperature estimation result EST: the estimation history PREV) and the sensor temperature Td at the concerned cycle. That is, the heater electrification control circuit 14 inherits the values at a subsequent cycle. The heater electrification control circuit 14 performs the temperature estimation calculation again based on the history of the previous calculation. Accordingly, the heater electrification control circuit 14 constantly performs calculation during an operation. In the heater electrification control circuit 14, a calculation result is held in a memory or the like and is reused in calculation of a subsequent cycle.

[Target Temperature Correction Process]

Next, temperature control of the fixing unit by the temperature control device according to the embodiment will be described.

Numerical values, clearance distances, temperatures, and temperature estimate values related to specifications and design of constituent units to be described below are appropriately set examples for description, and an embodiment is not limited thereto. In the following description, it is assumed that a "center" indicates a center portion of the heat roller 71, a position in contact with the center portion, or a position facing the center portion. It is assumed that a "side" indicates end portions on both sides centering on the center portion of the heat roller 71, positions in contact with the end portions of both sides, or positions facing the end portions.

Figure 7:
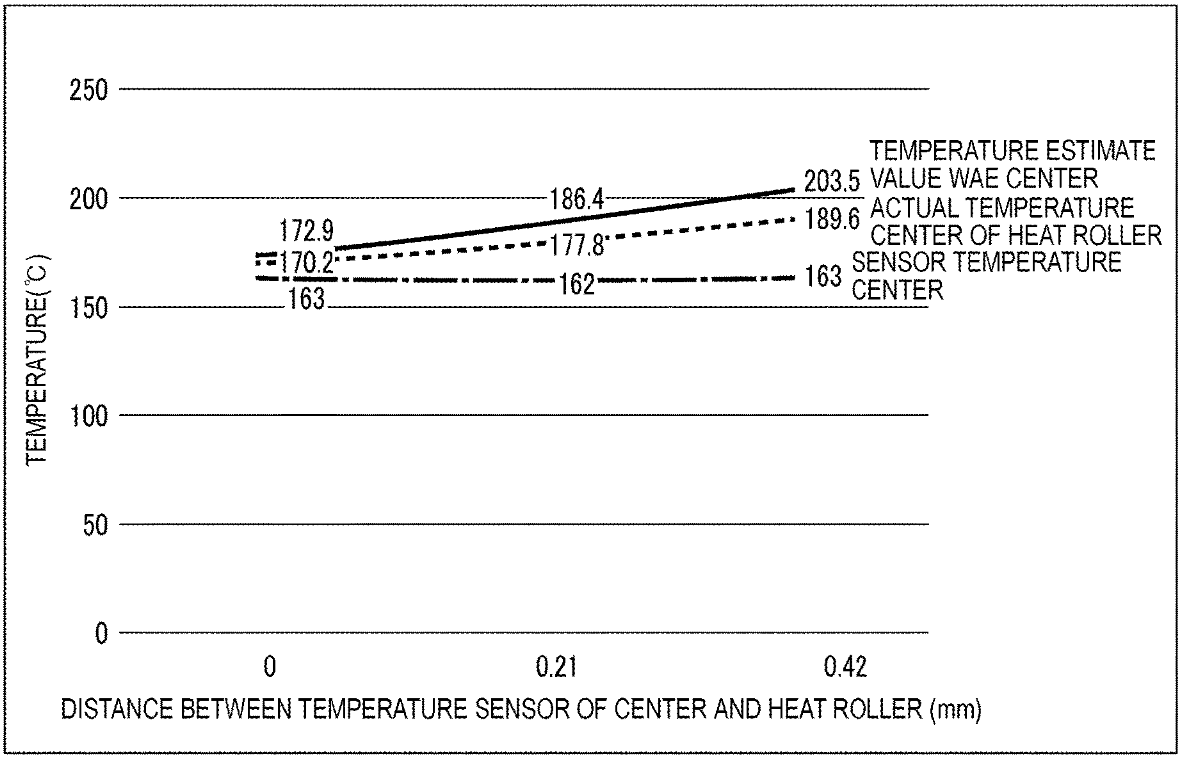
FIG. 7 is a diagram illustrating a temperature characteristic of a temperature estimate value WAE at the center, an actual temperature of the heat roller, and a sensor temperature.

FIG. 5 is a table illustrating an actually measured temperature and a temperature of a temperature estimate value when a clearance is left between contact surfaces of the heat roller 71 and the temperature sensor 74*a* at the center. It is assumed that such a clearance is a clearance when foreign matters are inserted or dirt is adhered. FIG. 7 illustrates transition of a temperature change of "the temperature estimate value WAE center", "the actual temperature center of the heat roller", and "the sensor temperature center" illustrated in FIG. 5 as temperature characteristics of the heat roller 71 and the temperature sensor 74*a* at the center.

In the temperature detection in FIG. 5, a target temperature (control temperature) is set to 160° C. for each of the set clearances (first to third clearances), the heating of the heat roller 71 by the warming-up ends, the waiting time of 40 seconds passed after start of the WAE control, the temperature detection by a thermocouple (actually measuring the surface temperature of the heat roller) is measured for 20 seconds, and an average temperature is set as a detected value. The waiting time is any set time in the embodiment and differs depending on a type of fixing unit, but an embodiment is not limited thereto.

The configuration of the fixing unit 21 which is an example used in the embodiment has specification and characteristics of a diameter of the heat roller (H/R) 71: ϕ30 mm (core thickness: 0.6 mm), a diameter of the pressurization roller (P/R) 72: ϕ30 mm, a P/R pressurization: 150 N, a heat roller center of 160° C./heat roller side of 155° C. of control temperature (in a waiting state), and a circumferential speed: 210 mm/sec. The number of processing sheets per unit time for the size A4 of a recording medium is set to 45 sheets/minute. As described above, the center heater 73*a* warming a center portion of the heat roller 71 and the side heaters 73*b* and 73*c* warming both ends of the heat roller 71 are provided inside the heat roller 71 to heat the heat roller 71. The center heater 73*a* and the side heater 73*b* and 73*c* can also perform temperature control individually.

In each item of the table illustrated in FIG. 5, a "distance between the temperature sensor (center) and the heat roller" indicates three patterns including a first clearance C1 of a clearance distance "0 mm" between the heat roller 71 and the temperature sensor 74*a* of the center, a second clearance C2 of a clearance distance "0.21 mm", and a third clearance C3 of a clearance distance "0.42 mm". As these clearances, the first clearance C1 is a separation distance in a contact state, the second clearance C2 is a separation distance of three superimposed pieces of Kapton tape (0.07 mm×3) which is assumed to be foreign matters, and the third clearance C3 is a separation distance of six superimposed pieces of Kapton tape (0.07 mm×6). In the embodiment, Kapton tape is used as foreign matters, but an embodiment is not limited thereto. Any substance which is not deformed or deposited by the heat can be used.

The "actual temperature center of the heat roller" is a temperature actually measured by mounting an external thermocouple (thermistor) in a center portion of the heat roller 71. The "sensor temperature center" is a temperature detected by the temperature sensor 74*a* disposed in the center portion of the heat roller 71. The "temperature estimate value WAE center" is a temperature estimate value used for the WAE control output from the coefficient adding circuit 84 in the heater electrification control circuit 14 using the sensor temperature Td detected by the temperature sensor 74*a* in the above-described clearance interposed therebetween. A "first temperature rise amount center" is a difference between the temperature estimate value WAE center and the sensor temperature center. A "second temperature rise amount center" is a difference between the actual temperature center of the heat roller 71 and the sensor temperature center. An "actual temperature rise amount center" is a difference between the temperature center of the normal heat roller measured in advance and a present actual temperature center of the heat roller.

Temperature characteristics when a clearance occurs between the heat roller 71 and the temperature sensor 74*a* will be described with reference to FIGS. 5 and 7. When the clearance occurs in the WAE control, it is detected that the temperature of the temperature sensor 74*a* is lower than an actual temperature even if the target temperature is set to 160° C. Thus, the temperature estimate value WAE is set to be large and the heating is performed by the center heater 73*a* so that the temperature is higher than a present temperature.

When the first clearance C1 (0 mm) is compared with the third clearance C3 (0.42 mm), the "sensor temperature center" is in the range of 162° C. to 163° C. and is a substantially constant temperature, but the "actual temperature center of the heat roller" obtained from the thermocouple rises from 170.2° C. to 189.6° C. and the "estimate value WAE center" also rises from 172.9° C. to 203.5° C. Accordingly, in accordance with a temperature difference between the estimate value WAE center and the sensor temperature center, it can be determined that abnormality occurs, such as abnormality in which foreign matters are interposed between the heat roller 71 and the temperature sensor 74*a* or dirt is adhered to either or both of the heat roller 71 and the temperature sensor 74*a*.

Figure 8:
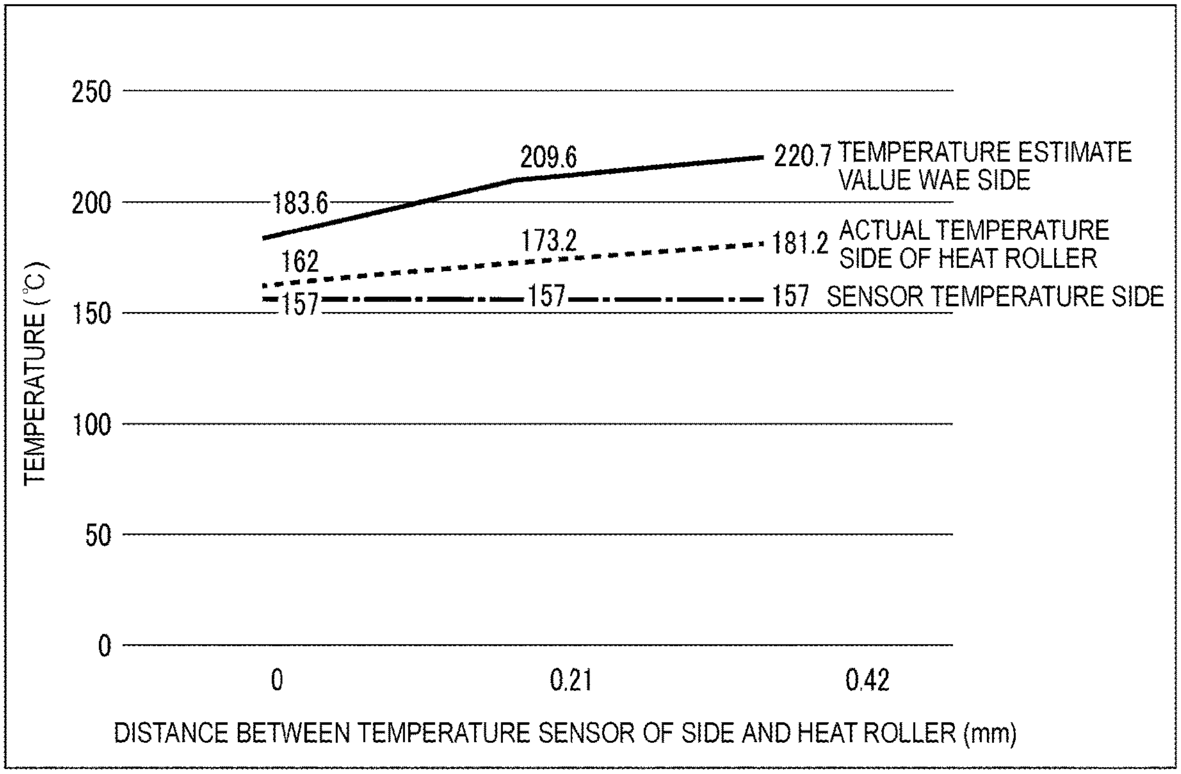
FIG. 8 is a diagram illustrating a temperature characteristic of a temperature estimate value WAE at the side, an actual temperature of the heat roller, and a sensor temperature.

Next, FIG. 6 is a table illustrating an actually measured temperature and a temperature of a temperature estimate value when a clearance is left between contact surfaces of the heat roller 71 and the temperature sensors 74*b* in both the sides. FIG. 8 illustrates transition of a temperature change of "the temperature estimate value WAE side", "the actual temperature side of the heat roller", and "the sensor temperature side" illustrated in FIG. 6 as temperature characteristics of both ends of the heat roller 71 and the temperature sensor 74*b*. The temperature detection in FIG. 6 is equal to the example of FIG. 5. After warming-up of the heat roller 71 ends and the waiting time of 40 seconds passed after start of the WAE control, the temperature detection by the thermocouple is measured for 20 seconds, and an average temperature is set as a detected value.

Each item of the table illustrated in FIG. 6 is the same as each item illustrated in FIG. 5 except that the "center" and the "side" are different. A "distance between the temperature sensor (side) and the heat roller" indicates three patterns including a first clearance S1 of a clearance distance "0 mm" between the heat roller 71 and the temperature sensor 74*b* of the side, a second clearance S2 of a clearance distance "0.21 mm", and a third clearance S3 of a clearance distance "0.42 mm". These clearances are formed by superimposing Kapton tape assumed to be foreign matters and interposing the tape, as described above.

Temperature characteristics when a clearance occurs between the heat roller 71 and the temperature sensor 74*b* will be described with reference to FIGS. 6 and 8. When the clearance occurs in the WAE control, it is detected that the temperature of the temperature sensor 74*b* is lower than an actual temperature even if the target temperature is set to 155° C. Therefore, the temperature estimate value WAE is set to be large and the heating is performed by the heater 73 so that the temperature is higher than a present temperature.

When the first clearance S1 (0 mm) is compared with the third clearance S3 (0.42 mm) in FIG. 6, the "sensor temperature side" is a substantially constant temperature of 157° C., but the "actual temperature side of the heat roller" obtained from the thermocouple rises from 162° C. to 181.2° C. and the "temperature estimate value WAE side" also rises from 183.6° C. to 220.7° C. Accordingly, by setting a temperature difference between the temperature estimate value WAE side and the sensor temperature side to exceed any threshold set in advance, it can be determined that abnormality occurs, such as abnormality in which foreign matters are interposed between the heat roller 71 and the temperature sensor 74*b* or dirt is adhered to either or both of the heat roller 71 and the temperature sensor 74*b*.

Figure 9:
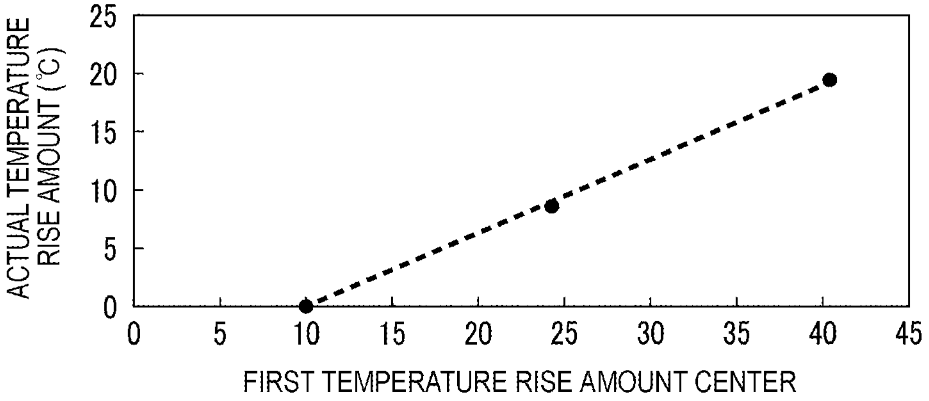
FIG. 9 is a diagram illustrating a correlation of a temperature rise amount based on the temperature characteristic at the center.

Next, FIG. 9 is a diagram (correlation diagram) illustrating a correlation of a temperature rise amount based on the temperature characteristic illustrated in FIG. 5. In FIG. 9, the horizontal axis represents the "first temperature rise amount center" and the vertical axis represents the "actual temperature rise amount center" illustrated in FIG. 5. For example, a correlation expression ($y=0.63x-6.49$) of a linear expression in the temperature sensor 74*a* can also be obtained from the correlation illustrated in FIG. 9. The temperature difference detection circuit 93 has a correlation (temperature characteristic of inclination) of the temperature rise amount, as illustrated in FIG. 9, in which the first temperature rise amount formed from the difference between the temperature estimate value WAE and the sensor temperature Td is correlated the actual temperature rise amount, and can estimate the actual temperature rise amount from the correlation illustrated in FIG. 9 based on the acquired temperature estimate value WAE and the sensor temperature Td.

Figure 10:
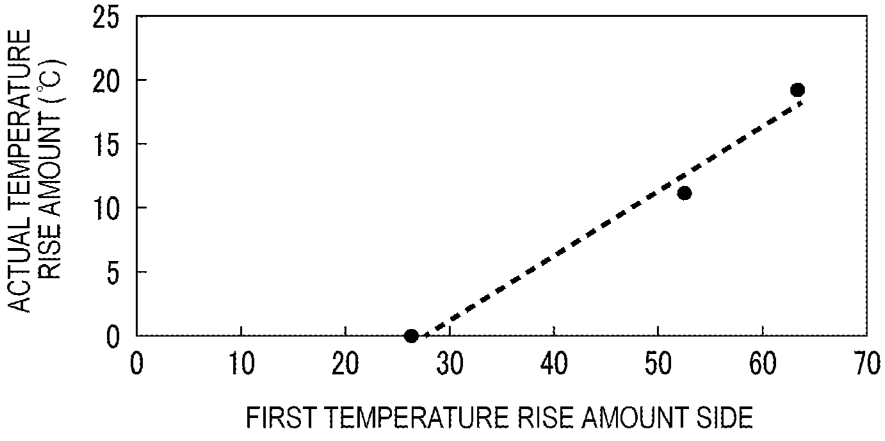
FIG. 10 is a diagram illustrating a correlation of a temperature rise amount based on the temperature characteristic at the side.

Similarly, FIG. 10 is a diagram (correlation diagram) illustrating a correlation of a temperature rise amount based on the temperature characteristic illustrated in FIG. 6. In FIG. 10, the horizontal axis represents the "first temperature rise amount side" and the vertical axis represents the "actual temperature rise amount side" illustrated in FIG. 6. For example, a correlation expression ($y=0.50x-13.78$) of a linear expression in the temperature sensor 74*a* can also be obtained from the correlation illustrated in FIG. 10.

For example, when the temperature estimate value WAE and the sensor temperature can be known from the correlations illustrated in FIGS. 9 and 10, the actual temperature and the actual temperature rise amount of the heat roller 71 can be estimated from the difference between the temperature estimate value WAE and the sensor temperature.

FIG. 11 is a diagram illustrating setting of a control correction temperature with respect to an actual temperature rise amount of the heat roller 71. A variation in temperature with respect to a detected value of the temperature sensor 74 used in the embodiment is assumed to be ±5° C. with respect to a reference temperature. Of course, this numerical value differs depending on the temperature sensor and the embodiment is not limited thereto.

As illustrated in FIG. 11, when 0 to ±5° C. from the target temperature is estimated as an actual temperature rise amount of the heat roller 71 from FIGS. 9 and 10, the temperature is determined to be normal based on the above-described variation in temperature and the WAE control continues. When the temperature does not rise, for example, when the actual temperature drops to −5° C., the heat roller 71 is appropriately heated.

The temperature correction is performed from a time point at which the actual temperature rise amount exceeds 5° C. That is, the WAE control is stopped and is switched to the temperature control in accordance with a target value corrected with a correction value correlated with the sensor temperature Td of the temperature sensor 74. Further, when the actual temperature rise amount is estimated to be in the range of 5° C. to 10° C., the control correction temperature is set to −5° C. and the temperature is corrected to a target temperature obtained by dropping −5° C. from a present target temperature. In this way, when the actual temperature rise amount is in the range of 10° C. to 15° C., the control correction temperature is set to −10° C. and the temperature is corrected to a target temperature obtained by dropping −10° C. from a present target temperature. When the actual temperature difference is in the range of 15° C. to 20° C., the control correction temperature is set to −15° C. and the temperature is corrected to a target temperature obtained by dropping −15° C. from a present target temperature. Thereafter, whenever the actual temperature rise amount is changed by 5° C., the temperature is corrected to a target temperature obtained by dropping −5° C.

Next, FIGS. 12 and 13 are diagrams illustrating setting of the control correction temperature. Here, FIGS. 12 and 13 illustrate correlations in which the actual temperature rise amount of the heat roller 71, the first temperature rise amount (a difference between the temperature estimate value WAE and the sensor temperature), and the control correction temperature are correlated. FIG. 12 illustrates a correlation in which the actual temperature rise amount of the heat roller 71, the first temperature rise amount center, and the control correction temperature are correlated. FIG. 13 illustrates a correlation in which the actual temperature rise amount of the heat roller 71, the first temperature rise amount side, and the control correction temperature are correlated. Here, instead of the WAE control, temperature control (second temperature control) in accordance with a target temperature corrected using the control correction temperature correlated to a detected sensor temperature is performed.

For example, when the actual temperature rise amount tb illustrated in FIG. 9 is 5° C. in the setting of the control correction temperature of the center of the heat roller 71 illustrated in FIG. 12, the first temperature rise amount center is about 18.1° C. Thereafter, the temperature of the first temperature rise amount center is about 25.9° C. in the case of an actual temperature rise amount of 10° C., is about 33.8° C. in the case of an actual temperature rise amount of 15° C., and is about 41.7° C. in the case of an actual temperature rise amount of 20° C.

For example, when the actual temperature rise amount tb illustrated in FIG. 10 is 5° C. in the setting of the control correction temperature of the side of the heat roller 71 illustrated in FIG. 13, the first temperature rise amount side is about 37.4° C. Thereafter, the temperature of the first temperature rise amount side is about 47.3° C. in the case of an actual temperature rise amount of 10° C., is about 57.3° C. in the case of an actual temperature rise amount of 15° C., and is about 67.2° C. in the case of an actual temperature rise amount of 20° C.

Referring to FIGS. 12 and 13, it is possible to estimate which ° C. the actual temperature rise amount tb is for both the temperatures of the center or the side from the first temperature rise amount ta and it is possible to further obtain a control correction temperature from the estimated actual temperature rise amount. For example, when the first temperature rise amount center ta which is a temperature difference between the temperature estimate value WAE center obtained by the WAE control and the sensor temperature center is 25° C., it is determined that the actual temperature rise amount tb occurring due to abnormality such as adhering of dirt or inserting of foreign matters rises by greater than 5° C. and equal to or less than 10° C. ($5<tb\leq 10$) on a temperature rise side from the target temperature. In this way, when the actual temperature rise amount tb rises in temperature, the preset WAE control (first temperature control) is stopped and the temperature control (second temperature control) is performed in accordance with the target temperature corrected using the control correction temperature correlated with the detected sensor temperature. Specifically, in this example, the correction target temperature obtained by subtracting the control correction temperature of −5° C. from a present target temperature is set to perform temperature control.

When the first temperature rise amount side to which is a temperature difference between the temperature estimate value WAE side and the sensor temperature side is 50° C., it is determined that dirt is adhered to the temperature sensor 74*b* and the actual temperature rise amount tb rises in temperature by greater than 10° C. and equal to or less than 15° C. ($10<tb\leq 15$) on the temperature rise side from the target temperature. When the actual temperature rise amount tb rises in temperature in this way, the present WAE control (first temperature control) is stopped, the correction target temperature obtained by subtracting the control correction temperature of −15° C. from the present target temperature is set, and the switching is performed to the temperature control (second temperature control) using the temperature sensor 74. In this way, it is possible to obtain an accurate correction value in accordance with the temperature difference from the correlation.

Next, temperature control including temperature correction by the temperature control device 101 according to the embodiment will be described with reference to the flowchart illustrated in FIG. 14. This example is assumed to be a configuration example in which the temperature control device 101 is mounted in the image forming apparatus 1.

First, the image forming apparatus 1 starts when the main power switch 24 is turned on (ACT11). The system controller 13 of the image forming apparatus 1 initializes each constituent unit to perform printing. At this time, the heater electrification control circuit 14 of the temperature control device 101 supplies power to the heater 73 and heats the heat roller 71 to start warming-up for starting the printing. When the warming-up ends, the WAE control is started (ACT12) and counting of a waiting time is started.

Subsequently, the system controller 13 determines whether the sensor temperature detected by the temperature sensor 74 (74*a* and 74*b*) is equal to or less than 40° C. (ACT13). When the sensor temperature is higher than 40° C. in the determination of ACT13 (NO), it cannot be accurately determined whether dirt adheres to the temperature sensor 74 or foreign matters are inserted. Therefore, it is determined that the first temperature control by the WAE control continues and the control mode is not switched to a control mode by the second temperature control. In the second temperature control, as illustrated in FIGS. 5 to 13 described above, temperature control is performed in accordance with a target temperature corrected using a control correction temperature that has a correlation with the detected sensor temperature. Conversely, when the sensor temperature detected by the temperature sensor 74 is equal to or less than 40° C. in the determination of ACT13 (YES), it is determined that the control mode is switched to the control mode by the second temperature control.

Subsequently, it is determined whether a printing instruction on a recording medium is received (ACT14). When the printing instruction is received in the determination of ACT14 (YES), printing is performed on the recording medium while the WAE control continues. Conversely, when the printing instruction is not received in the determination of ACT14 (NO), it is determined whether the waiting time counted from the start of the WAE control reached 40 seconds or more (ACT15).

When the waiting time is less than 40 seconds in the determination of ACT15 (NO), the counting of the time continues. When the waiting time reached 40 seconds (YES), the temperature estimate value WAE center and the temperature estimate value WAE side at the center and the side start to be stored in the first storage circuit 91. Simultaneously, the sensor temperature Td detected by the temperature sensors 74*a* and 74*b* at the center and side starts to be stored in the second storage circuit 92 at the same timing as that of the temperature estimate values WAE (center and side) (ACT16). The storing starts and the counting of the storing time starts. A timing of sampling in the storing is appropriately set.

Subsequently, it is determined whether 20 seconds passed from the start of the storing of the temperature estimate values WAE and the sensor temperature Td (ACT17). When 20 seconds does not pass in the determination of ACT17

(NO), the temperature estimate value WAE and the sensor temperature Td are continuously stored. Conversely, when 20 seconds passed in the determination of ACT17 (YES), an average value of the temperature estimate value WAE and the sensor temperature Td for 20 seconds is calculated and is stored in the first storage circuit 91 and the second storage circuit 92 (ACT18). When a printing instruction is received during storing of the temperature estimate value WAE and the sensor temperature Td, the storing operation is stopped, the printing on the recording medium is performed. Thereafter, the counting of the waiting time is performed again.

Subsequently, the temperature difference detection circuit 93 reads the temperature estimate value WAE center from the first storage circuit 91, reads the sensor temperature center from the second storage circuit 92, and obtains a first temperature rise amount center (difference between the temperature estimate value WAE and the sensor temperature) taC. It is determined whether the first temperature rise amount center taC is higher than a preset threshold temperature thC (ACT19). Here, as threshold temperatures th, the threshold temperature thC of the center is set to "18.1° C." and a threshold temperature thS of the side is set to 37.4° C. Of course, the threshold temperatures are appropriately set temperatures and the embodiment is not limited thereto.

When the first temperature rise amount center taC is equal to or less than 18.1° C. which is the preset threshold temperature thC in the determination of ACT19 (NO), it is determined that the heat roller 71 of the fixing unit 21 and the temperature sensor 74*a* are normal and the WAE control continues. When the first temperature rise amount center taC is greater than the preset threshold temperature of 18.1° C. in the determination of ACT19 (YES), it is determined that abnormality occurs, such as abnormality in which dirt is adhered to the temperature sensor 74*a* of the center or foreign matters are interposed between the heat roller 71 and the temperature sensor 74*a*, and the control switching signal SW is output to the difference comparison circuit 86 so that the WAE control of the center (first temperature control) can be stopped (ACT20). The difference comparison circuit 86 receiving the control switching signal SW stops calculating the difference DIF between the temperature estimate value WAE from the coefficient adding circuit 84 and the target temperature TGT from the target temperature output circuit 85. Accordingly, the WAE control of the center (first temperature control) is stopped.

After the WAE control of the center (first temperature control) is stopped, this control is switched to the second temperature control in which the temperature control is performed by the above-described temperature sensor, and the control temperature correction in which the target temperature is corrected at the center (correction in which the target temperature is dropped) is performed (ACT21). For example, the target temperature correction circuit 94 uses the correlation of the temperature illustrated in FIGS. 11 and 12, and when the calculated first temperature rise amount ta is "20° C." ($18.1<ta\leq25.9$), an actual temperature rise amount corresponds to $5<tb\leq10$ and "−5° C." is obtained as the control correction temperature. Accordingly, the correction target temperature Tad obtained by subtracting −5° C. from a present target temperature is calculated and output to the target temperature output circuit 85. The target temperature output circuit 85 outputs the target temperature TGT including the correction target temperature Tad to the difference comparison circuit 86. The difference comparison circuit 86 calculates the difference DIF between the target temperature TGT and the sensor temperature Td at the center and outputs the difference DIF to the control signal generation circuit 87.

Subsequently, in ACT21, when the control temperature correction is performed to correct the target temperature, a serviceperson is notified that abnormality occurs in temperature control of the fixing unit 21 (ACT22). As notification content, specifically, it may be suggested that a fault occurs between the heat roller 71 and the temperature sensor 74.

After the notification in ACT22, continuously, a first temperature rise amount side taS is obtained from a difference between the temperature estimate value WAE side and the sensor temperature side. It is determined whether the first temperature rise amount side taS is greater than the preset threshold temperature thS (ACT23). Here, as described above, the threshold temperature thS of the side is set to 37.4° C.

When the first temperature rise amount side taS is equal to or less than 37.4° C. which is the preset threshold temperature thS in the determination of ACT23 (NO), it is determined that the heat roller 71 of the fixing unit 21 and the temperature sensor 74*b* are normal and the WAE control continues. Conversely, when the first temperature rise amount side taS is greater than the preset threshold temperature of 37.4° C. in the determination of ACT23 (YES), it is determined that abnormality occurs, such as abnormality in which dirt is adhered to the temperature sensor 74*b* of the side or foreign matters are interposed between the heat roller 71 and the temperature sensor 74*b*, and the control switching signal SW is output to the difference comparison circuit 86 so that the WAE control of the side (first temperature control) can be stopped (ACT24). In this example, even when abnormality occurs in either temperature sensor 74*b*, it is comprehensively treated as if abnormality occurs in both the temperature sensors 74*b* of both sides.

The difference comparison circuit 86 receiving the control switching signal SW stops the WAE control of the side (first temperature control) by stopping calculation of the difference between the temperature estimate value WAE from the coefficient adding circuit 84 and the target temperature TFT from the target temperature output circuit 85. Thereafter, the control is switched to the above-described second temperature control and the control temperature correction for correcting the target temperature in the side (correction in which the target temperature is dropped) is performed (ACT25). For example, the target temperature correction circuit 94 uses the correlation of the temperature illustrated in FIGS. 11 and 13, and when the calculated first temperature rise amount ta is "50° C." ($47.3<ta\leq57.3$), an actual temperature rise amount corresponds to $10<tb\leq15$ and "−10° C." is obtained as the control correction temperature. Accordingly, the correction target temperature Tad obtained by subtracting −10° C. from a present target temperature is calculated and output to the target temperature output circuit 85. The target temperature output circuit 85 outputs the target temperature TGT including the correction target temperature Tad to the difference comparison circuit 86. The difference comparison circuit 86 calculates the difference DIF between the target temperature TGT and the sensor temperature Td at the side and outputs the difference DIF to the control signal generation circuit 87.

Subsequently, in ACT25, when the control temperature correction is performed to correct the target temperature, a serviceperson is notified that abnormality occurs in temperature control of the fixing unit 21 (ACT26). As notification content, specifically, it may be suggested that a fault occurs between the heat roller 71 and the temperature sensor 74.

As described above, the temperature control device according to the embodiment continuously performs the temperature control by the correction in which the target temperature is dropped using the temperature sensor until the serviceperson takes countermeasures. In the temperature control device that has such a configuration, it is possible to prevent in advance a failure such as hot offset and an emergency stop of the apparatus, including a service call, which may occur in the fixing unit 21 by detecting an abnormality occurring in the temperature sensor at the center and the sides and performing an appropriate temperature control.

Figure 14:
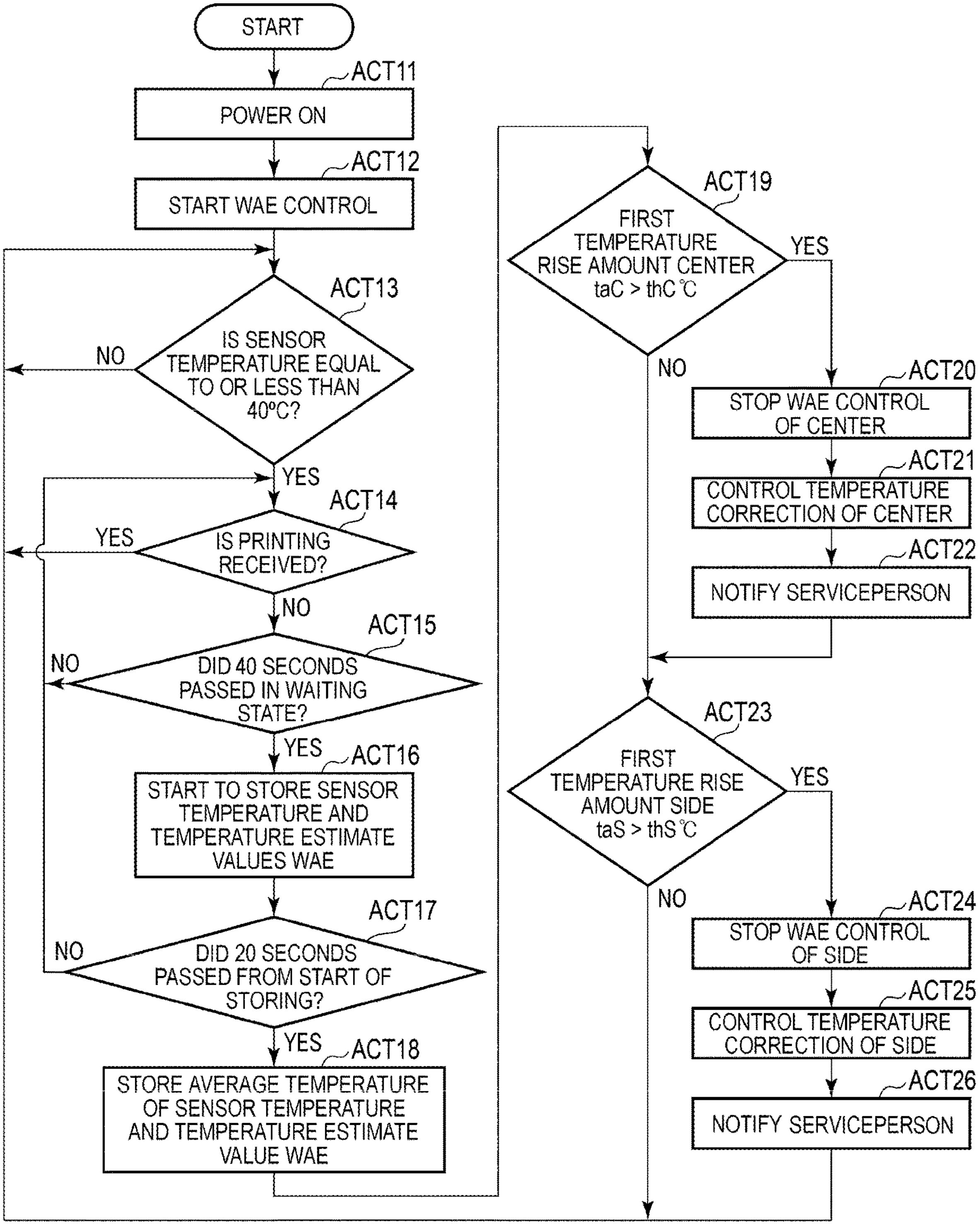
FIG. 14 is a flowchart illustrating temperature control of the fixing unit.

In the flowchart illustrated in FIG. 14, the first temperature rise amount is within a defined temperature range determined to be normal if dirt adhered to the temperature sensor 74 is removed or foreign matters that were caught came off by feeding a recording medium therethrough. Therefore, a step of returning the control from the second temperature control using the temperature sensor to the WAE control from determination in which correction is not performed based on control correction temperature may be incorporated.

The image forming apparatus according to the embodiment may be communicably connected to an external apparatus, for example, a personal computer in a workplace such as a home or a branch office via a network such as the Internet, so that printing of various types of information or maintenance management can be performed through a remote operation of the personal computer. Warning information of the above-described maintenance management results may be displayed on the personal computer.

Second Configuration Example of Fixing Unit

Figure 15:
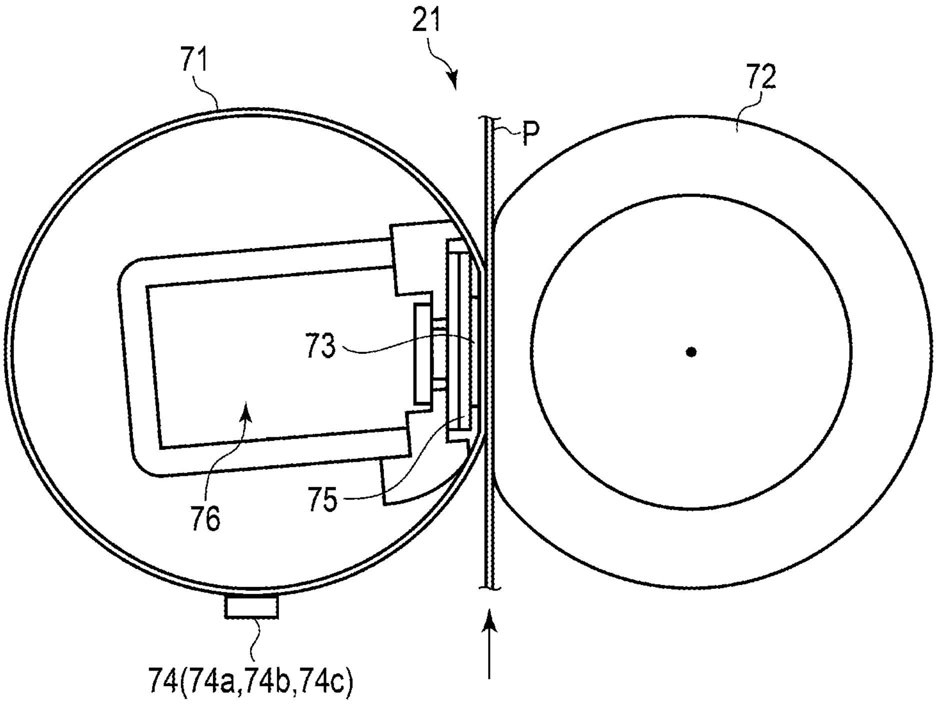
FIG. 15 is a diagram illustrating a second configuration example of the fixing unit.
Figure 16:
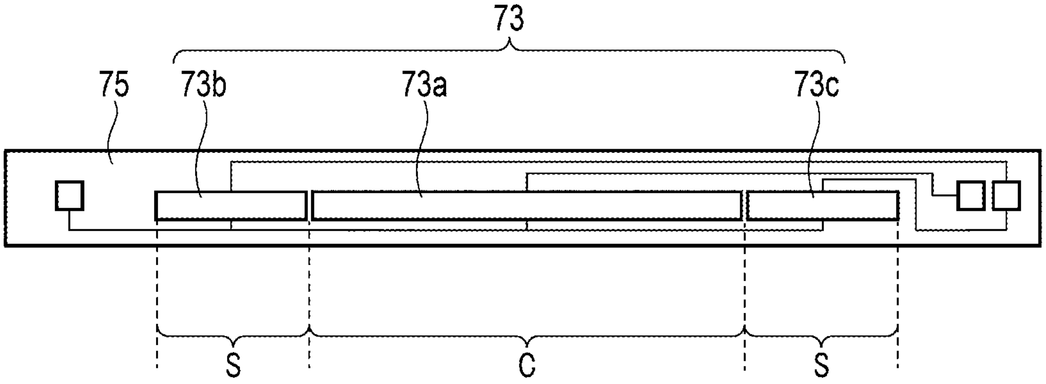
FIG. 16 is a diagram illustrating a configuration example of the heater unit in the fixing unit of the second configuration example.

Next, a second configuration example of a fixing unit which can be applied to the image forming apparatus 1 according to the embodiment will be described. FIG. 15 is a diagram illustrating the second configuration example of the fixing unit. FIG. 16 is a diagram illustrating a configuration example of the heater unit in the fixing unit in the second configuration example.

The fixing unit 21 includes the temperature sensors 74, the heat roller 71 formed of a cylindrical film as a fixing member, the pressurization roller 72, the heater (for example, a lamp heater) 73, and a heater substrate 75. The pressurization roller 72 forms a nip with the heat roller 71. The heat roller 71 and the pressurization roller 72 heat the recording medium P entering the nip while pressurizing the recording medium P. In the temperature sensor 74, a contact type temperature detection element such as a thermistor is used, and the center temperature sensor 74*a* and two side temperature sensors 74*b* and 74*c* are included.

The heater unit 76 is formed by the heater 73, the heater substrate 75, and the like. As the heater 73, for example, a halogen heater, a lamp heater, an IH heater, a resistance heater, or the like can be used. The heater substrate 75 is formed in a slender rectangular plate shape using a metal material, a ceramic material, or the like. The heater substrate 75 is disposed inside in a radial direction of the heat roller 71. The long side of the rectangle of the heater substrate 75 is oriented in a direction along a shaft direction of the heat roller 71.

The heater 73 according to the embodiment includes, for example, the center heater 73*a*, the side heater 73*b*, and the side heater 73*c* divided as three partitions. The heaters 73*a*, 73*b*, and 73*c* are disposed to be arranged in a direction (the longitudinal direction of the heater substrate 75) orthogonal to a sheet conveyance direction. The center heater 73*a* is disposed so that the middle position of the center heater 73*a* matches a middle position in a width direction (a direction orthogonal to the conveyance direction) of the recording medium P passing through the nip. The two side heaters 73*b* and 73*c* are disposed to be adjacent to both ends in the longitudinal direction of the center heater 73*a*.

The center heater 73*a* in the heater 73 is a first heat source, and the side heaters 73*b* and 73*c* are a second heat source. The center heater 73*a* supplies heat centering on the center region C in a direction orthogonal to the sheet conveyance direction indicated by an arrow, as illustrated in FIG. 15. Here, even when only the center heater 73*a* is caused to generate heat, a temperature of the side regions S also rises due to heat transfer. The side heaters 73*b* and 73*c* supply heat centering on the side regions S in the direction orthogonal to the sheet conveyance direction, as illustrated in FIG. 15.

The temperature sensor 74*a* mainly detect a temperature of the center region C heated by the center heater 73*a*. The temperature sensors 74*b* and 74*c* mainly detect temperatures of the side regions S heated by the side heaters 73*b* and 73*c*. The fixing unit 21 can control heating under the above-described WAE control.

As described above, the above-described WAE control can also be performed in the fixing unit 21 illustrated in FIGS. 15 and 16. Therefore, in the image forming apparatus 1 including the fixing unit 21 illustrated in FIGS. 15 and 16, the temperature control can be performed using the above-described WAE estimate value.

Third Configuration Example of Fixing Unit

Figure 17:
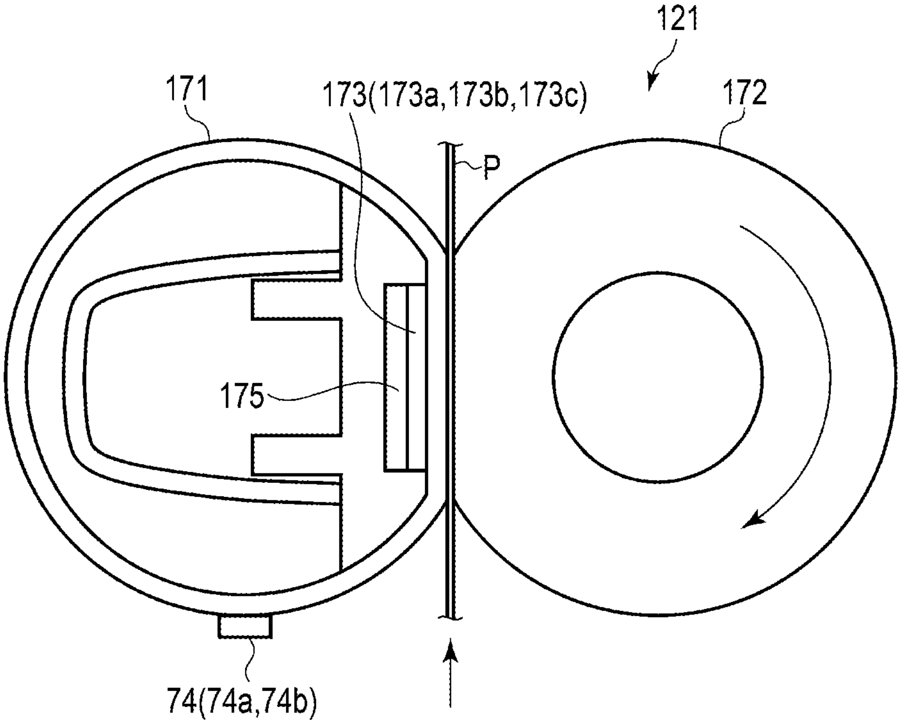
FIG. 17 is a diagram illustrating a third configuration example of the fixing unit.
Figure 18:
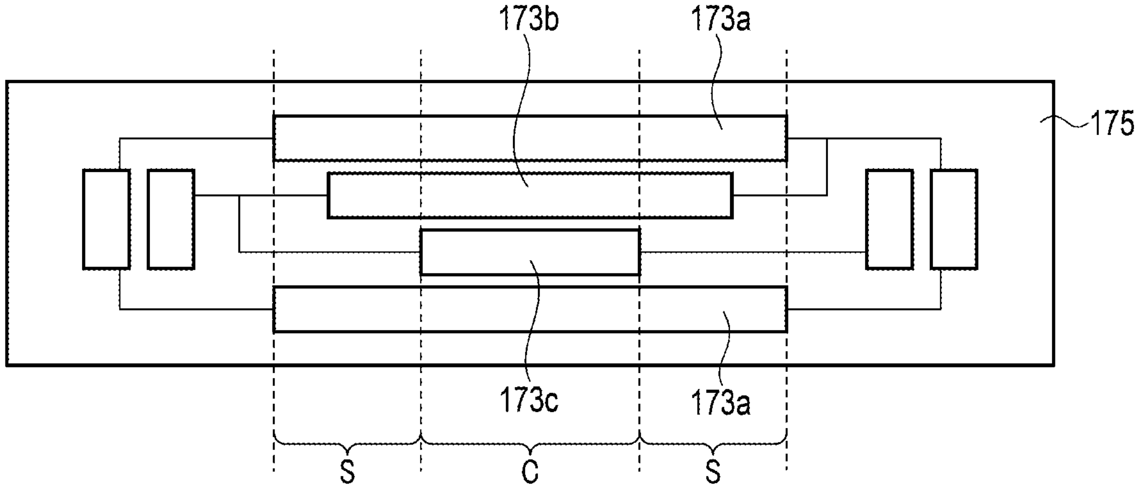
FIG. 18 is a diagram illustrating a configuration example of the heater unit in the fixing unit of the third configuration example.

Next, a third configuration example of a fixing unit which can be applied to the image forming apparatus 1 according to the embodiment will be described. FIG. 17 is a diagram illustrating the third configuration example of the fixing unit. FIG. 18 is a diagram illustrating a configuration example of the heater unit in the fixing unit in the third configuration example.

As illustrated in FIG. 17, a fixing unit 121 includes the temperature sensors 74 (74*a* and 74*b*), a cylindrical film 171 serving as a fixing member (fixing rotator), a pressurization roller 172, a heater, and a heater substrate 175. The pressurization roller 172 forms a nip with the cylindrical film 171. The cylindrical film 171 and the pressurization roller 172 heat the recording medium P entering the nip while pressurizing the recording medium P.

The heater unit includes heaters 173 and the heater substrate 175. The heater substrate 175 is formed of a metal material, a ceramic material, or the like. The heater substrate 175 is formed in a slender rectangular plate shape. The heater substrate 175 is disposed inside in a radial direction of the cylindrical film 171. For the heater substrate 175, an axial direction of the cylindrical film 171 is a longitudinal direction.

The heaters 173 include a plurality of heaters 173*a*, 173*b*, and 173*c*. The heaters 173 are disposed in the heater substrate 175 to come into contact with the inner surface of the cylindrical film 171. The side heaters 173*a* and the center heaters 173*b* and 173*c* are resistors that generate heat by power supplied from an alternating-current power supply.

The side heater 173*a* is used to fix the toner to the recording medium P that has a maximum width (sheet width) of the recording medium P in the direction orthogonal to the conveyance direction. The side heater 173*a* has a width corresponding to the maximum sheet width. The side heaters 173*a* are disposed upstream and downstream in the conveyance direction of the recording medium P in the heater substrate 175.

The center heater 173*b* is a heater shorter than the side heater 173*a* in the direction orthogonal to the conveyance direction of the recording medium P. The heater 173*c* is a heater further shorter than the center heater 173*b* in the direction orthogonal to the conveyance direction of the recording medium P. The side heaters 173*a* are main heaters and the center heaters 173*b* and 173*c* are sub-heaters. The main heaters and the sub-heaters are controlled to be turned on and off in accordance with the sheet width of the recording medium P.

As described above, the above-described WAE control can be performed also in the fixing unit 121 illustrated in FIGS. 17 and 18. Therefore, in the image forming apparatus including the fixing unit 121 illustrated in FIGS. 17 and 18, the temperature control can be performed using the above-described WAE estimate value.

Fourth Configuration Example of Fixing Unit

Figure 19:
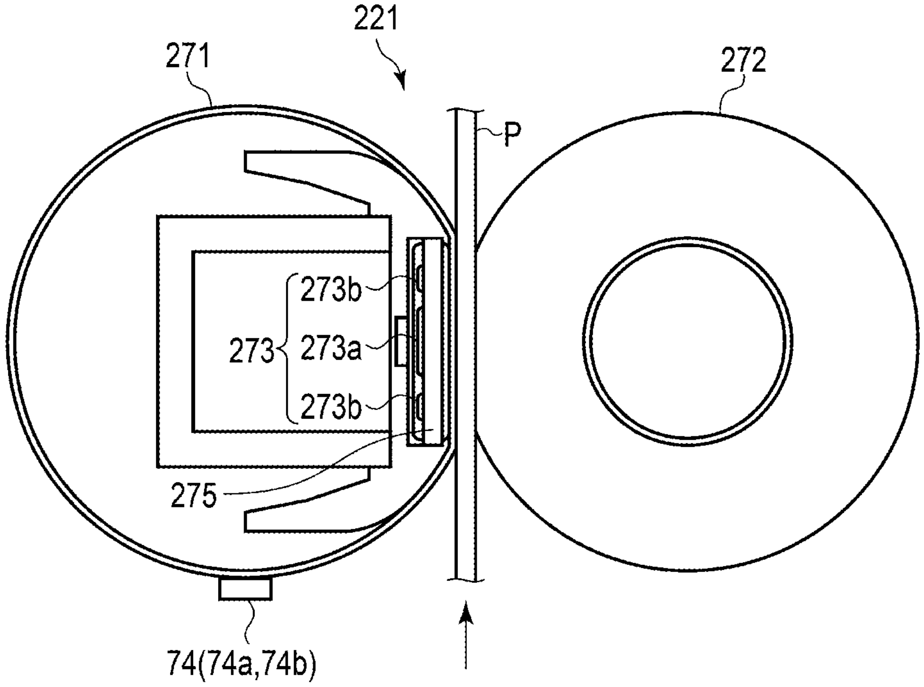
FIG. 19 is a diagram illustrating a fourth configuration example of the fixing unit.
Figure 20:
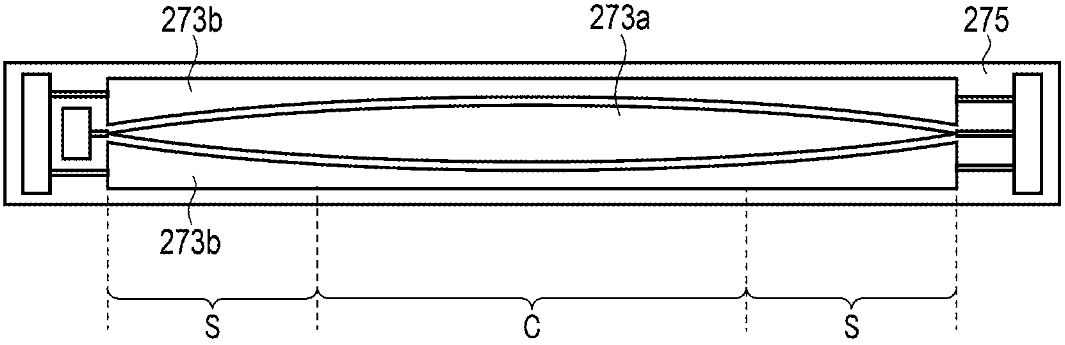
FIG. 20 is a diagram illustrating a configuration example of the heater unit in the fixing unit of the fourth configuration example.

Next, a fourth configuration example of a fixing unit which can be applied to the image forming apparatus 1 according to the embodiment will be described. FIG. 19 is a diagram illustrating the fourth configuration example of the fixing unit. FIG. 20 is a diagram illustrating a configuration example of the heater unit in the fixing unit in the fourth configuration example.

As illustrated in FIG. 19, a fixing unit 221 includes the temperature sensors 74 (74*a* and 74*b*), a cylindrical film 271 serving as a fixing member (fixing rotator), a pressurization roller 272, heaters 273, and a heater substrate 275. The pressurization roller 272 forms a nip with the cylindrical film 271. The cylindrical film 271 and the pressurization roller 272 heat the recording medium P entering the nip while pressurizing the recording medium P.

The heater unit includes the heaters 273 (273*a* and 273*b*) and the heater substrate 275. The heater substrate 275 is formed of a metal material, a ceramic material, or the like. The heater substrate 275 is formed in a slender rectangular plate shape. The heater substrate 275 is disposed inside in a radial direction of the cylindrical film 271. For the heater substrate 275, an axial direction of the cylindrical film 271 is a longitudinal direction.

The heaters 273 include a plurality of heaters 273*a* and 273*b*. The heaters 273 are disposed in the heater substrate 275 to come into contact with the inner surface of the cylindrical film 271. The center heater 273*a* and the side heaters 273*b* are resistors that generate heat by power supplied from an alternating-current power supply.

The center heater 273*a* has a width corresponding to the maximum width of the recording medium P in the direction orthogonal to the conveyance direction. As illustrated in FIG. 20, the center heater 273*a* has a large width in the conveyance direction in the center portion in the direction orthogonal to the conveyance direction and a small width in the conveyance direction at ends. The center heater 273*a* is a main heater configured to heat the center region C mainly. The heaters 273*b* have a small width in the conveyance direction in the center portion in the direction orthogonal to the conveyance direction and a large width in the conveyance direction at ends. The heaters 273*b* are sub-heaters configured to heat the side regions S mainly. The main heater and the sub-heaters are controlled to be turned on and off in accordance with the sheet width of the recording medium P.

As described above, the above-described WAE control can be performed in the fixing unit 221 illustrated in FIGS. 19 and 20. Therefore, in the image forming apparatus 1 including the fixing unit 221 illustrated in FIGS. 19 and 20, the temperature control can be performed using the above-described WAE estimate value.

Fifth Configuration Example of Fixing Unit

Figure 21:
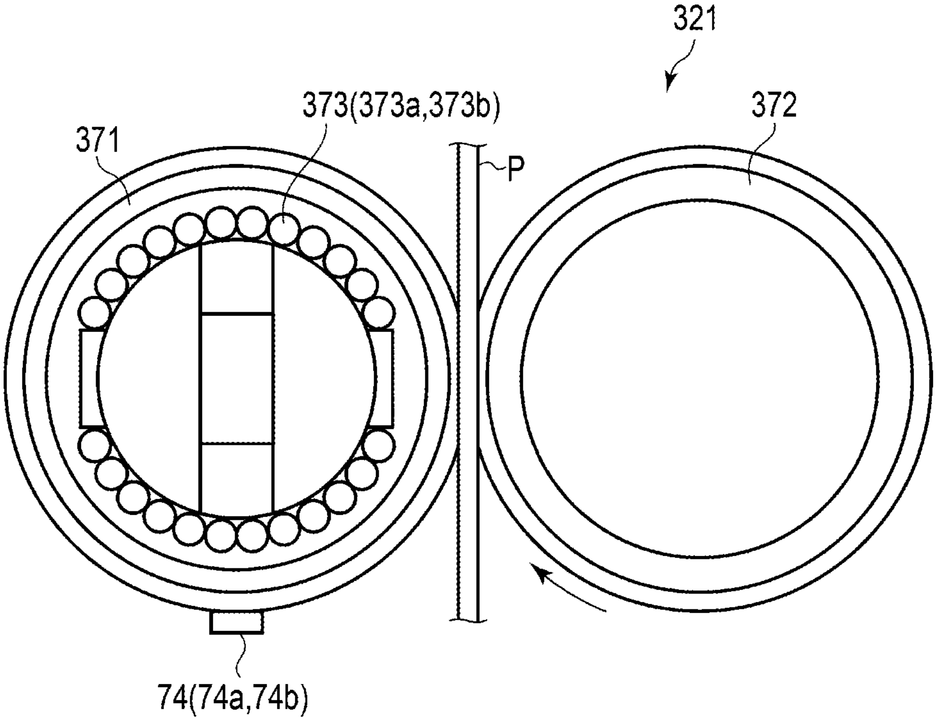
FIG. 21 is a diagram illustrating a fifth configuration example of the fixing unit.
Figure 22:
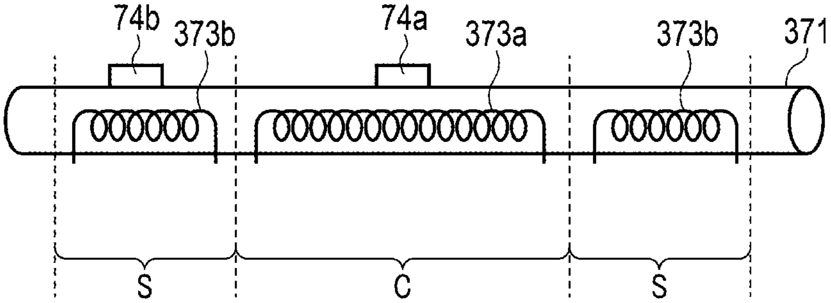
FIG. 22 is a diagram illustrating a configuration example of the heater unit in the fixing unit of the fifth configuration example.

Next, a fifth configuration example of a fixing unit which can be applied to the image forming apparatus 1 according to the embodiment will be described. FIG. 21 is a diagram illustrating the fifth configuration example of the fixing unit. FIG. 22 is a diagram illustrating a configuration example of the heater unit in the fixing unit in the fifth configuration example.

As illustrated in FIG. 21, a fixing unit 321 includes the temperature sensors 74 (74*a* and 74*b*), a heat roller 371 serving as a fixing member, a pressurization roller 372, and induction heating coils 373. The pressurization roller 372 forms a nip with the heat roller 371. The heat roller 371 and the pressurization roller 372 heat the recording medium P entering the nip while pressurizing the recording medium P.

The induction heating coils 373 are examples of heat sources that heat the heat roller 371 serving as a fixing member. The induction heating coils 373 include a center coil 373*a* and end coils 373*b*. The center coil 373*a* and the end coils 373*b* are disposed inside the heat roller 371 in parallel in a direction (a rotational axis direction of the heat roller 371) orthogonal to the conveyance direction of a sheet. The center coil 373*a* is disposed so that a center position is matched in the width direction (the direction orthogonal to the conveyance direction) of the recording medium P passing through the nip. The end coils 373*b* are disposed in parallel on both sides of the center coil 373*a*.

The center coil 373*a* is an example of a first heat source. The center coil 373*a* heats the center region C of the heat roller 371 in the direction orthogonal to the sheet conveyance direction, as illustrated in FIG. 22. The end coils 373*b* are an example of a second heat source. The end coils 373*b* heat the side regions S of the heat roller 371 in the direction orthogonal to the sheet conveyance direction, as illustrated in FIG. 22.

The temperature sensors 74*a* and 74*b* are contact type temperature detection devices such as thermistors similarly to the fixing unit 21 of the above-described first configuration example. The temperature sensor 74*a* detects a temperature of the center region C of the heat roller 371. The temperature sensor 74*b* detects a temperature of the side region C of the heat roller 371.

As described above, the above-described WAE control can be performed in the fixing unit 321 illustrated in FIGS. 21 and 22. Therefore, in the image forming apparatus 1 including the fixing unit 321 illustrated in FIGS. 21 and 22, the temperature control can be performed using the above-described WAE estimate value.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A temperature controller configured to control power supplied to a heater based on a temperature estimate value estimated over time so that a temperature control target, to which heat propagates from the heater of a fixer, reaches a preset target temperature, the temperature controller comprising:

a temperature sensor configured to detect a temperature of the heater;

a first storage circuit configured to store the temperature estimate value acquired at a random time;

a second storage circuit configured to store a sensor temperature detected by the temperature sensor;

a temperature difference detection circuit configured to calculate an actual temperature rise amount from a temperature difference between the temperature estimate value read from the first storage circuit and the temperature of the heater read from the second storage circuit; and a target temperature correction circuit having a plurality of control correction temperatures correlated to the actual temperature rise amount calculated from a difference between (i) a normal temperature control target during a rise of the temperature of the heater and (ii) a present actual temperature of the temperature control target, wherein the target temperature correction circuit is configured to lower a target temperature by generating a correction target temperature corrected by subtracting the control correction temperature in accordance with the actual temperature rise amount from a present set target temperature.

2. The controller according to claim 1, wherein the temperature difference detection circuit has a temperature characteristic in which a first temperature rise amount, the first temperature rise amount calculated from a difference between the temperature estimate value and the sensor temperature, and the actual temperature rise amount are associated with each other, and is configured to estimate the actual temperature rise amount from the temperature characteristic based on the acquired temperature estimate value and the sensor temperature.

3. The controller according to claim 1, further comprising a temperature estimation circuit configured to estimate the temperature estimate value of the temperature control target from a thermal capacity of the heater and a thermal resistance of the fixer based on electrification to the heater.

4. An image forming apparatus comprising the temperature controller according to claim 1.

5. A method causing a processor to perform a process by each circuit of the temperature controller according to claim 1.

6. The image forming apparatus of claim 4, wherein the image forming apparatus is a multi-function peripheral.

7. The controller according to claim 1, wherein the temperature sensor includes a plurality of temperature sensors, each of the plurality of temperature sensors contacting a different region of the heater.

8. The controller according to claim 1, wherein the temperature estimate value is obtained by weighted average control.

9. A temperature controller configured to control power supplied to a heater based on a temperature estimate value estimated over time so that a temperature control target, to which heat propagates from the heater of a fixer, reaches a preset target temperature, the temperature controller comprising:

a temperature sensor configured to detect a temperature of the heater;

a first storage circuit configured to store the temperature estimate value acquired at a random time;

a second storage circuit configured to store a sensor temperature detected by the temperature sensor;

a temperature difference detection circuit having a temperature characteristic in which a first temperature rise amount, the first temperature rise amount being calculated from a difference between the temperature estimate value and the sensor temperature, and an actual temperature rise amount are associated with each other, wherein the temperature difference detection circuit is configured to estimate the actual temperature rise amount from the temperature characteristic based on the acquired temperature estimate value and the sensor temperature; and a target temperature correction circuit configured to lower a target temperature in accordance with the actual temperature rise amount.

10. The controller according to claim 9, further comprising a temperature estimation circuit configured to estimate the temperature estimate value of the temperature control target from a thermal capacity of the heater and a thermal resistance of the fixer based on electrification to the heater.

11. The controller according to claim 10, wherein the target temperature correction circuit has a plurality of control correction temperatures correlated to the actual temperature rise amount calculated from a difference between (i) a normal temperature control target during a rise of the temperature of the heater and (ii) a present actual temperature of the temperature control target, and the target temperature correction circuit is configured to generate a correction target temperature corrected by subtracting the control correction temperature in accordance with the actual temperature rise amount from a presently set target temperature.

12. An image forming apparatus comprising the temperature controller according to claim 9.

13. The image forming apparatus of claim 12, wherein the image forming apparatus is a multi-function peripheral.

14. The controller according to claim 9, wherein the temperature sensor includes a plurality of temperature sensors, each of the plurality of temperature sensors contacting a different region of the heater.

15. The controller according to claim 14, wherein the temperature estimate value is obtained by weighted average control.

16. A method causing a processor to perform a process by each circuit of the temperature controller according to claim 15.

17. The method of claim 16, further comprising:

calculating a plurality of control correction temperatures correlated to the actual temperature rise amount from a difference between (i) a normal temperature control target during a rise of the temperature of the heater and (ii) a present actual temperature of the temperature control target, and generating a correction target temperature corrected by subtracting the control correction temperature in accordance with the actual temperature rise amount from a presently set target temperature.

18. The method of claim 17, further comprising:

estimating the temperature estimate value of the temperature control target from thermal capacity of the heater and thermal resistance of the fixer based on electrification to the heater.

19. A temperature controller configured to control power supplied to a heater based on a temperature estimate value estimated over time so that a temperature control target, to which heat propagates from the heater of a fixer, reaches a preset target temperature, the temperature controller comprising:

a temperature estimation circuit configured to estimate the temperature estimate value of the temperature control target from a thermal capacity of the heater and a thermal resistance of the fixer based on electrification to the heater;

a temperature sensor configured to detect a temperature of the heater;

a first storage circuit configured to store the temperature estimate value acquired at a random time;

a second storage circuit configured to store a sensor temperature detected by the temperature sensor;

a temperature difference detection circuit configured to calculate an actual temperature rise amount from a temperature difference between the temperature estimate value read from the first storage circuit and the temperature of the heater read from the second storage circuit; and a target temperature correction circuit configured to lower a target temperature in accordance with the actual temperature rise amount.

20. The controller according to claim 1, wherein the temperature estimate value is obtained by weighted average control.

* * * * *